United States Patent
Ikarashi et al.

(10) Patent No.: US 9,475,224 B2
(45) Date of Patent: Oct. 25, 2016

(54) INJECTION MOLDING MACHINE AND METHOD FOR CONTROLLING INJECTION MOLDING MACHINE

(75) Inventors: Masaaki Ikarashi, Nagoya (JP); Mamoru Kawasaki, Nagoya (JP)

(73) Assignee: MITSUBISHI HEAVY INDUSTRIES PLASTIC TECHNOLOGY CO., LTD., Nagoya-shi (JP)

( * ) Notice: Subject to any disclaimer, the term of this patent is extended or adjusted under 35 U.S.C. 154(b) by 595 days.

(21) Appl. No.: 13/983,926

(22) PCT Filed: Apr. 6, 2011

(86) PCT No.: PCT/JP2011/058708
§ 371 (c)(1),
(2), (4) Date: Aug. 6, 2013

(87) PCT Pub. No.: WO2012/137320
PCT Pub. Date: Oct. 11, 2012

(65) Prior Publication Data
US 2013/0313746 A1    Nov. 28, 2013

(51) Int. Cl.
*B29C 45/18* (2006.01)
*B29C 45/67* (2006.01)
(Continued)

(52) U.S. Cl.
CPC ............ *B29C 45/18* (2013.01); *B29C 45/67* (2013.01); *B29C 45/7653* (2013.01); *B29C 45/82* (2013.01); *B29C 2045/826* (2013.01)

(58) Field of Classification Search
CPC .................. B29C 45/82; B29C 2045/826
USPC .................. 264/40.1, 40.5; 425/149
See application file for complete search history.

(56) References Cited

U.S. PATENT DOCUMENTS

| 6,341,953 B1 | 1/2002 | Okubo et al. |
| 2007/0054007 A1* | 3/2007 | Yamaura ............... B29C 45/82 425/587 |
| 2012/0093968 A1* | 4/2012 | Yuan ...................... F15B 1/024 425/542 |

FOREIGN PATENT DOCUMENTS

| CN | 101410632 A | 4/2009 |
| JP | 01-128819 A | 5/1989 |

(Continued)

OTHER PUBLICATIONS

Machine translation JAP to ENG of JP 2001-241402 A.*
(Continued)

*Primary Examiner* — Alison L Hindenlang
*Assistant Examiner* — Lawrence D Hohenbrink, Jr.
(74) *Attorney, Agent, or Firm* — Westerman, Hattori, Daniels & Adrian, LLP

(57) ABSTRACT

A hydraulic supply device of an injection molding machine is provided with: a first main hydraulic power source including a first main hydraulic pump having a variable capacity and driven by a first constant rotational speed motor, and a first main discharge pipe through which working oil flows; an auxiliary hydraulic power source including an auxiliary hydraulic pump driven by a servo motor and operated at a specific capacity, an auxiliary discharge pipe through which the working oil flows, and a check valve that regulates the inflow of working oil to the auxiliary hydraulic pump; a hydraulic control unit that controls the first main hydraulic power source and the auxiliary hydraulic power source; a junction pipe at which the first main discharge pipe and the auxiliary discharge pipe join; and a switching unit that switches the supply/non-supply of working oil for a hydraulic actuator.

11 Claims, 14 Drawing Sheets

(51) Int. Cl.
  *B29C 45/76*  (2006.01)
  *B29C 45/82*  (2006.01)

(56) References Cited

FOREIGN PATENT DOCUMENTS

| JP | 10-249510 A | 9/1998 |
|---|---|---|
| JP | 11-105095 A | 4/1999 |
| JP | 11240056 A | 9/1999 |
| JP | 2001241402 A * | 9/2001 |
| JP | 3245707 B2 | 1/2002 |
| JP | 2003-021105 A | 1/2003 |
| JP | 3377564 B2 | 2/2003 |
| JP | 3415061 B2 | 6/2003 |
| JP | 3436679 B2 | 8/2003 |
| JP | 3611260 B2 | 1/2005 |
| JP | 2006-123426 A | 5/2006 |
| JP | 2007-167939 A | 7/2007 |
| JP | 4324148 B2 | 9/2009 |
| JP | 4355309 B2 | 10/2009 |
| JP | 2009-269325 A | 11/2009 |
| JP | 2009-297912 A | 12/2009 |
| JP | 2009-298064 A | 12/2009 |
| WO | 2007/114339 A1 | 10/2007 |
| WO | 2009/154027 A1 | 12/2009 |

OTHER PUBLICATIONS

International Search Report dated Jul. 12, 2011 issued in corresponding International Application No. PCT/JP2011/058708; w/ English Translation. (4 pages).

Written Opinion of the International Search Authority dated Jul. 12, 2011, issued in corresponding Application No. PCT/JP2011/058708; w/ English Translation. (7 pages).

Japanese Office Action dated Aug. 5, 2014, issued in Japanese Application No. 2013-508676; w/ English Translation. (3 pages).

Office Action dated Jan. 6, 2015, issued in corresponding Chinese Patent Application No. 2011800688406, with Partial English translation (7 pages).

* cited by examiner

INJECTION MOLDING MACHINE AND METHOD FOR CONTROLLING INJECTION MOLDING MACHINE

TECHNICAL FIELD

The present invention relates to an injection molding machine that performs injection molding, and a method of controlling an injection molding machine.

BACKGROUND ART

Injection molding is performed by carrying out a mold clamping step of closing a mold to perform mold clamping, an injection step of injecting a material into the mold, a mold opening step of opening a mold after the injected material solidifies, an ejecting step of ejecting a molded product anchored to the mold, and the like. Additionally, an injection molding machine that carries out such injection molding includes a plurality of hydraulic actuators for carrying out respective steps, and a hydraulic supply device for supplying working oil to the hydraulic actuators. A pressure control or a flow rate control is executed by the hydraulic supply device to make the hydraulic actuators generate driving forces to carry out the respective steps.

As hydraulic supply devices of such injection molding machines, there are known hydraulic supply devices including a hydraulic pump that variably control the rotational speed of a servo motor connected to a servo circuit so as to control a discharge flow rate (for example, refer to Patent Document 1 and Patent Document 2). Additionally, the hydraulic supply device of the injection molding machine of Patent Document 2 includes a plurality of hydraulic pumps and a plurality of servo motors that rotationally drive the hydraulic pumps. Therefore, a large-sized drive motor can be made unnecessary, and regions where the capacity of the drive motor does not suit can be reduced, and stability of control can be achieved.

PRIOR ART DOCUMENT

Patent Document

Patent Document 1: Japanese Patent Publication No. 3245707

Patent Document 2: Japanese Patent Publication No. 4355309

SUMMARY OF INVENTION

Problem to be Solved by the Invention

However, the injection molding machines that make the servo motors rotationally drive the hydraulic pumps as in Patent Document 1 and Patent Document 2 have the following problems.

That is, firstly, there is a problem in that the energy loss during a pressure control is large. During pressure controls in a mold clamping step, a pressure maintaining step, and the like, the amount of pump discharge becomes extremely small and the hydraulic pumps and the servo motors operate at low-speed rotation. Since the operation of the hydraulic pumps at low-speed rotation becomes a significantly low-efficiency both in the volumetric efficiency of the hydraulic pumps and the motor efficiency of the servo motors, the energy loss increases.

Additionally, secondly, there is a problem in that the risk of hydraulic pump damage during the pressure control is high. As described above, during the pressure controls, the amount of pump discharge becomes extremely small. Therefore, it is not possible for working oil to circulate within the hydraulic pumps and performs cooling. As a result, the heat generated within the hydraulic pumps is accumulated in pump bodies, whereby the hydraulic pumps and the working oil in the hydraulic pumps have high temperature. If the hydraulic pumps and the working oil have high temperature, slide clearance is reduced due to thermal expansion of hydraulic pump members, and oil films are readily broken due to degradation in the viscosity of the working oil. As a result, there is a concern of damage to members caused by poor lubrication in a portion where the members, such as bearings, slide against each other, and a concern of damage to the members caused by heat deformation.

Additionally, thirdly, in the case of the servo motors, there is a problem in that motors with large capacity are required, compared to a case where three-phase induction motors or the like are adopted. In any of the pressure controls or the flow rate controls, high load is always applied to all corresponding servo motors while a hydraulic pump is operated. Additionally, the servo motors have the number of positioning pulses input thereto, and are feedback-controlled based on the rotation angle of an encoder. For this reason, the servo motors cause positional deviation in a state where the rotation resistance during high load is large, and in order to feedback-correct this, larger torque than that of the three-phase induction motors or the like is generated. Particularly, during a high-pressure low-flow-rate operation of an injection pressure maintaining step of maintaining pressure for a given period of time after a material is injected into the mold, or the like, the servo motors perform a high-torque low-rotational-speed operation. Therefore, the root mean square torque in the servo motors increases. For this reason, when the servo motors are adopted as driving sources of the hydraulic pumps, motors with large capacity are required, which leads to a significant cost rise.

The present invention has been made in order to solve the above problems, and an object thereof is to provide an injection molding machine that can actuate respective hydraulic actuators by hydraulic pressure with high efficiency to perform injection molding, without increasing the size of motors that drive hydraulic pumps, and a method for controlling the injection molding machine.

Means for Solving the Problem

In order to solve the above problems, the present invention proposes the following means.

The present invention provides an injection molding machine including a plurality of hydraulic actuators, and a hydraulic supply device that supplies working oil to the hydraulic actuators to actuate the hydraulic actuators. An injection molding is performed by actuating the plurality of hydraulic actuators. The hydraulic supply device includes a first main hydraulic power source having a first constant rotational speed motor that rotates at a constant rotational speed, a first main hydraulic pump that is driven by the rotational driving of the first constant rotational speed motor to discharge working oil, the first main hydraulic pump having variable capacity, and a first main discharge pipe through which the working oil discharged from the first main hydraulic pump flows; an auxiliary hydraulic power source having a servo motor in which rotational speed is controlled by a servo control circuit, an auxiliary hydraulic pump that is driven by the rotational driving of the servo motor to discharge working oil, the auxiliary hydraulic pump that operates with a preset specific capacity, an auxiliary discharge pipe through which the working oil discharged from the auxiliary hydraulic pump flows, and a check valve that is provided at the auxiliary discharge pipe to regulate the inflow of working oil to the auxiliary hydraulic pump; a hydraulic control unit that controls the first main hydraulic power source and the auxiliary hydraulic power source; a junction pipe at which the first main discharge pipe and the auxiliary discharge pipe join; and a switching unit that has the junction pipe connected thereto, and switches the supply and non-supply of working oil to at least some of the plurality of hydraulic actuators.

According to this configuration, in the first main hydraulic power source, working oil is discharged from the first main hydraulic pump by rotationally driving the first constant rotational speed motor at a constant rotational speed. Additionally, since the first main hydraulic pump has variable capacity, the discharge amount of working oil can be adjusted by changing the capacity. On the other hand, in the auxiliary hydraulic power source, working oil can be discharged from the auxiliary hydraulic pump by rotationally driving the servo motor. Additionally, since the motor that rotationally drives the auxiliary hydraulic pump is the servo motor, the discharge amount of working oil can be adjusted by changing rotational speed under the control by the servo control circuit. Since the first main hydraulic power source and the auxiliary hydraulic power source are joined together by the junction pipe and are connected to the respective hydraulic actuators via the switching unit, working oil can be supplied from both the first main hydraulic power source and the auxiliary hydraulic power source, and can be set to a desired pressure or flow rate. Since the auxiliary hydraulic power source is rotationally driven by the servo motor, working oil can be set to a desired pressure or flow rate with a fast response. Additionally, since the check valve that regulates the inflow of working oil to the auxiliary hydraulic pump is provided at the auxiliary discharge pipe connected to the junction pipe in the auxiliary hydraulic power source, the first main hydraulic pump and the first constant rotational speed motor of the first main hydraulic power source can be driven in a state where the auxiliary hydraulic pump and the servo motor of the auxiliary hydraulic power source are stopped. In this way, even if the amount of pump discharge becomes extremely small during a pressure control, the operation of the auxiliary hydraulic power source is limited, so that the amount of pump discharge per one hydraulic pump can be secured, the motor can be rotated at a rotational speed of a certain value or more, and thus, a decline in efficiency can be suppressed. Additionally, therefore, by rotating the motor at a low speed, the hydraulic pump can be reliably prevented from having a high temperature and being damaged. Additionally, by operating only the first main hydraulic power source to limit the operation of the auxiliary hydraulic power source during a high-pressure low-flow-rate operation that is required to output high torque, it is unnecessary to make the auxiliary hydraulic power source cope with the high-pressure low-flow-rate operation that has high load, and the servo motor of the auxiliary hydraulic power source can be compact.

In the injection molding machine, when a request for inputting a hydraulic pressure is received so as to obtain a predetermined pressure or flow rate in the junction pipe, the hydraulic control unit operates the first main hydraulic power source and selectively operates the auxiliary hydraulic power source based on a required pressure or flow rate.

Additionally, the present invention provides a method for controlling an injection molding machine that actuates a plurality of hydraulic actuators to perform injection molding. The injection molding machine includes the hydraulic actuators, and a hydraulic supply device that supplies working oil to the hydraulic actuators to actuate the hydraulic actuators. The hydraulic supply device includes a first main hydraulic power source having a first constant rotational speed motor that rotates at a constant rotational speed, a first main hydraulic pump that is driven by the rotational driving of the first constant rotational speed motor to discharge working oil, the first main hydraulic pump having variable capacity, and a first main discharge pipe through which the working oil discharged from the first main hydraulic pump flows; at least one auxiliary hydraulic power source having a servo motor in which rotational speed is controlled by a servo control circuit, an auxiliary hydraulic pump that is driven by the rotational driving of the servo motor to discharge working oil, the auxiliary hydraulic pump that operates with a preset specific capacity, an auxiliary discharge pipe through which the working oil discharged from the auxiliary hydraulic pump flows, and a check valve that is provided at the auxiliary discharge pipe to regulate the inflow of working oil to the auxiliary hydraulic pump; a hydraulic control unit that controls the first main hydraulic power source and the auxiliary hydraulic power source; a junction pipe at which the first main discharge pipe and the auxiliary discharge pipe join; and a switching unit that has the junction pipe connected thereto, and switches the supply and non-supply of working oil to at least some of the plurality of hydraulic actuators. The first main hydraulic power source is operated and the auxiliary hydraulic power source is selectively operated based on a required pressure or flow rate, when a request for inputting a hydraulic pressure is received so as to obtain a predetermined pressure or flow rate in the junction pipe.

According to these configurations and methods, working oil can be supplied at a required pressure or flow rate by the first main hydraulic power source and the auxiliary hydraulic power source under the control performed by the hydraulic control unit. At this time, the auxiliary hydraulic power source is selectively operated based on a required pressure or flow rate. Therefore, the amount of pump discharge per one hydraulic pump can be secured, the motor can be rotated at a rotational speed of a certain value or more, and thus, a decline in efficiency can be suppressed. Additionally, the operation of the auxiliary hydraulic power source in a high-pressure low-flow-rate state can be limited.

The above injection molding machine further includes a pressure detector that is provided at the junction pipe to detect the pressure of working oil within the junction pipe. The hydraulic control unit has a pressure threshold setting unit that sets a pressure threshold lower than a pressure control value of the hydraulic actuators in correspondence with the auxiliary hydraulic power source, based on the pressure control value; a pressure command generating unit that generates a pressure command corresponding to the pressure control value and outputs to the first main hydraulic power source and the auxiliary hydraulic power source; and a pressure determining unit that determines whether or not the pressure of working oil detected by the pressure detector is equal to or more than the pressure threshold set by the pressure threshold setting unit. When the pressure determining unit determines that the pressure of working oil is greater than the pressure threshold, a stop command for stopping the auxiliary hydraulic power source corresponding to the pressure threshold is output.

Additionally, the above method for controlling an injection molding machine further includes a pressure threshold setting step of setting a pressure threshold lower than a pressure control value of the hydraulic actuators in correspondence with the auxiliary hydraulic power source, based on the pressure control value, a pressure command generating step of generating a pressure command corresponding to the pressure control value and outputting the pressure command to the first main hydraulic power source and the auxiliary hydraulic power source, and a pressure determining step of determining whether or not the pressure of working oil within a pipe at the junction pipe is equal to or higher than the pressure threshold set by the pressure threshold setting unit. When it is determined in the pressure determining step that the pressure of working oil is greater than the pressure threshold, a stop command for stopping the auxiliary hydraulic power source corresponding to the pressure threshold is output.

According to these configurations and methods, working oil is discharged from the first main hydraulic power source and the auxiliary hydraulic power source in a state where the pressure of the working oil in the junction pipe has a pressure equal to or lower than the pressure threshold when the working oil is discharged until the pressure of working oil becomes the pressure control value. Therefore, a discharge flow rate can be rapidly increased toward the pressure control value so as to increase pressure. Particularly, since the auxiliary hydraulic power source can be driven by the servo motor, the discharge flow rate and the pressure can be increased with a fast response. On the other hand, in a pressure state where the pressure of the working oil is higher than the pressure threshold, the auxiliary hydraulic power source corresponding to the pressure threshold has the stop command output thereto and is stopped. For this reason, the operation of the auxiliary hydraulic power source in a high-pressure low-flow-rate state can be limited.

The above injection molding machine includes a plurality of the auxiliary hydraulic power sources. In the hydraulic control unit, the pressure threshold setting unit sets the pressure threshold with a different magnitude for each auxiliary hydraulic power source. The pressure determining unit performs determination by means of the pressure thresholds. The hydraulic control unit sequentially stops the auxiliary hydraulic power sources until the pressure of working oil reaches the pressure control value.

According to this configuration, the plurality of auxiliary hydraulic power sources is provided. Therefore, the discharge flow rate and the pressure can be increased up to the pressure control value with a faster response, and the operation of the auxiliary hydraulic power sources in a high-pressure low-flow-rate state can be limited.

In the above injection molding machine, the hydraulic control unit has a flow rate command generating unit that generates flow rate commands corresponding to the first main hydraulic power source and the auxiliary hydraulic power source, respectively, based on a flow rate control value of the hydraulic actuators targeted, and outputs the flow rate commands to the corresponding first main hydraulic power source and the corresponding auxiliary hydraulic power source, respectively. The flow rate command generating unit refers to a preset table having a first flow rate range that is a range of a flow rate where only the first main hydraulic power source is actuated, and a second flow rate range that is a range of a flow rate that is set to a greater flow rate than the first flow rate range and where the first main hydraulic power source and the auxiliary hydraulic power source are actuated. When the flow rate control value is included in the first flow rate range, the flow rate command generating unit outputs a flow rate command corresponding to the flow rate control value to the first main hydraulic power source. When the flow rate control value is included in the second flow rate range, the flow rate command generating unit selects the auxiliary hydraulic power source to be driven based on the magnitude of the flow rate control value, outputs a preset flow rate command corresponding to the auxiliary hydraulic power source to the selected auxiliary hydraulic power source, and outputs a flow rate command to the first main hydraulic power source, corresponding to the shortfall in the flow rate of working oil which is generated in the selected auxiliary hydraulic power source with respect to the flow rate control value.

Additionally, the above method for controlling an injection molding machine further includes a flow rate command outputting step of generating flow rate commands corresponding to the first main hydraulic power source and the auxiliary hydraulic power source, respectively, based on the flow rate control value of the hydraulic actuators targeted, and outputting the flow rate commands to the corresponding first main hydraulic power source and auxiliary hydraulic power source, respectively. In the flow rate command outputting step, reference is made to a preset table having a first flow rate range that is a range of a flow rate where only the first main hydraulic power source is actuated, and a second flow rate range that is a range of a flow rate that is set to a greater flow rate than the first flow rate range and where the first main hydraulic power source and the auxiliary hydraulic power source are actuated. When the flow rate control value is included in the first flow rate range, a flow rate command corresponding to the flow rate control value is output to the first main hydraulic power source. When the flow rate control value is included in the second flow rate range, the auxiliary hydraulic power source to be driven is selected based on the magnitude of the flow rate control value, a preset flow rate command corresponding to the auxiliary hydraulic power source is output to the selected auxiliary hydraulic power source, and a flow rate command is output to the first main hydraulic power source, corresponding to the shortfall in the flow rate of working oil which is generated in the selected auxiliary hydraulic power source with respect to the flow rate control value.

According to these configurations and methods, in a case where the flow rate control value is included in the first flow rate range that is a range of a flow rate that is smaller than the second flow rate range in the preset table when the working oil is discharged so that the flow rate in the junction pipe becomes the flow rate control value, the discharge amount per one hydraulic pump can be secured by operating only the first main hydraulic power source. Additionally, the operation of the auxiliary hydraulic power source in a low-flow-rate state as in the first flow rate range can be limited. On the other hand, in a case where the flow rate control value is included in the second flow rate range that is a range of a flow rate that is greater than the first flow rate range, the operation speed of a predetermined hydraulic actuator can be secured by the first main hydraulic power source and the selected auxiliary hydraulic power source by selecting the auxiliary hydraulic power source to be driven according to the size of the flow rate control value and outputting a flow rate command.

The above injection molding machine includes a plurality of the auxiliary hydraulic power sources. The second flow rate range of the table is divided into a plurality of stages equal to or more than the number of the auxiliary hydraulic power sources. The flow rate command generating unit of the hydraulic control unit increases the number of the auxiliary hydraulic power sources to be operated based on the stages of the second flow rate range.

According to this configuration, since the injection molding machine includes the plurality of auxiliary hydraulic power sources, the auxiliary hydraulic power sources can be operated by an optimal number of operations according to a flow rate within the second flow rate range.

In the above injection molding machine, the flow rate command generating unit outputs flow rate commands to the auxiliary hydraulic power sources in each step based on step information that specifies the types of a plurality of steps in injection molding as the auxiliary hydraulic power sources selected in the respective stages of the second flow rate range are different each other.

According to this configuration, since the auxiliary hydraulic power sources is selected in respective stages and the each of selected auxiliary hydraulic power sources is different, an unbalance in operation opportunities of the plurality of auxiliary hydraulic power sources can be eliminated.

In the above injection molding machine, the flow rate commands for the auxiliary hydraulic power sources in the second flow rate range are set to flow rates having a predetermined efficiency or higher for every auxiliary hydraulic power source.

According to this configuration, when the auxiliary hydraulic power sources are operated in the second flow rate range, the auxiliary hydraulic power sources can be operated with a predetermined efficiency or higher, and the overall efficiency can be improved.

In the injection molding machine, the hydraulic actuators include a mold opening and closing cylinder that generates a driving force so that opens and closes the mold, a mold clamping cylinder that clamps the mold, an injection cylinder that generates a driving force for injecting a material into the mold to an injection apparatus, a metering motor that melts and meters the material, an injection apparatus moving cylinder that generates a driving force to moves the injection apparatus, and an ejection cylinder that generates a driving force for performing ejection of a molded product within the mold. The hydraulic supply device includes a second main hydraulic power source that has a second constant rotational speed motor that rotates at a constant rotational speed, a second main hydraulic pump that is driven by the rotational driving of the second constant rotational speed motor to discharge working oil, and a second main discharge pipe through which the working oil discharged from the second main hydraulic pump flows. The second main hydraulic power source is independent from the first main hydraulic power source and the auxiliary hydraulic power source. The mold opening and closing cylinder, the injection cylinder, and the metering motor are connected to the first main hydraulic power source and the auxiliary hydraulic power source via the switching unit and the junction pipe. The injection apparatus moving cylinder and the ejection cylinder are connected to the second main hydraulic power source.

According to this configuration, working oil is supplied to the injection apparatus moving cylinder and the ejection cylinder in which do not require high pressure and large capacity, from the second main hydraulic power source that is independent from the first main hydraulic power source and the auxiliary hydraulic power source, and the hydraulic actuators to which working oil is supplied from the first main hydraulic power source and the auxiliary hydraulic power source is limited. For this reason, since the injection apparatus can be moved or a molded product of the mold can be ejected, in parallel to the operation of opening and closing the mold by the mold opening and closing cylinder that is a hydraulic actuator to which working oil is supplied from the first main hydraulic power source and the auxiliary hydraulic power source, the operation of metering molten resin within a heating cylinder by the metering motor, or the like, a molding cycle can be shortened and productivity can be improved. Additionally, at this time, since the first main and auxiliary hydraulic power sources and the second main hydraulic power source are independent from each other and are not influenced by each other, even when the above parallel operation is performed, degradation in the precision of an operation control by each hydraulic power source can be prevented.

Effect of the Invention

According to the present invention, respective hydraulic actuators can be actuated by hydraulic pressure with high efficiency to perform injection molding, without increasing the size of motors that drive hydraulic pumps.

DESCRIPTION OF EMBODIMENTS

First Embodiment

A first embodiment according to the present invention will be described below with reference to the drawings.

Figure 1:
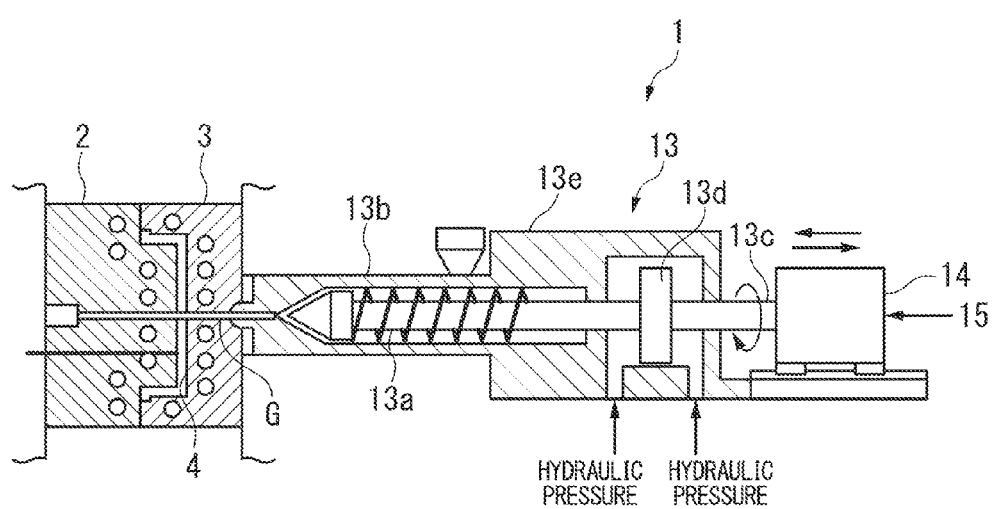
FIG. 1 is a cross-sectional view showing the outline of an injection apparatus in an injection molding machine according to a first embodiment of the present invention.
Figure 2:
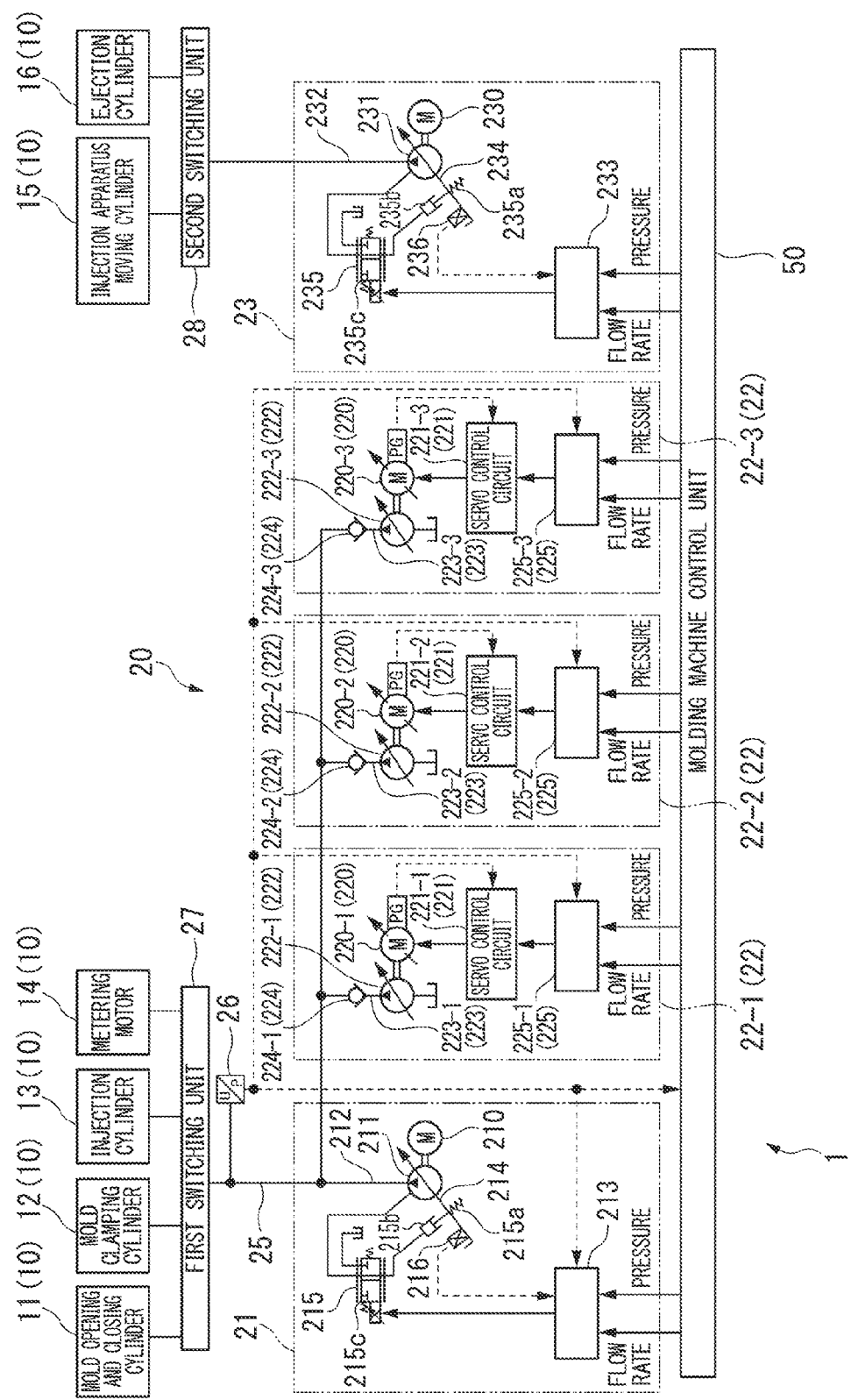
FIG. 2 is a block diagram of a hydraulic supply device, in the injection molding machine according to the first embodiment of the present invention.

As shown in FIGS. 1 and 2, an injection molding machine 1 of the present embodiment includes a movable mold 2 and a stationary mold 3 for obtaining a molded product with a desired shape, an injection apparatus 5 that injects molten resin that is an injection material into a cavity 4 formed between the movable mold 2 and the stationary mold 3, hydraulic actuators 10 that generate driving forces for performing various operations, a hydraulic supply device 20 that supplies working oil to the hydraulic actuators 10, and a molding machine control unit 50 that controls various components. In the present embodiment, as shown in FIG. 2, the hydraulic actuators 10 include a mold opening and closing cylinder 11, a mold clamping cylinder 12, an injection cylinder 13, a metering motor 14, an injection apparatus moving cylinder 15, and an ejection cylinder 16.

In FIG. 1, the stationary mold 3 is fixed to a stationary platen (not shown) of a mold clamping apparatus. Additionally, the movable mold 2 is fixed to a movable platen (not shown) capable of performing an approach operation or a separation operation with respect to the stationary platen (not shown) that fixes the stationary mold 3, in the mold clamping apparatus. The movable mold 2 is switchable between a closed state where the movable mold is made to approach the stationary mold 3 to form a cavity 4 and an open state where the movable mold is made to separate from the stationary mold 3, by the advance and retreat of the mold opening and closing cylinder 11. Additionally, the movable mold 2 and the stationary mold 3 are clamped by the mold clamping cylinder 12 in the closed state.

As shown in FIG. 1, the injection cylinder 13 includes an injection screw 13a, a heating cylinder 13b that houses the injection screw 13a and is connectable with a gate G of the stationary mold 3, a coupling shaft 13c that is coupled to a base end of the injection screw 13a, a piston 13d that is provided at the coupling shaft 13c, and a casing 13e that is coupled to a base end of the heating cylinder 13b and houses the piston 13d. It is possible to inject the molten resin within the heating cylinder 13b into the cavity 4 via the gate G by advancing the piston 13d.

Additionally, the metering motor 14 is coupled to the coupling shaft 13c. For this reason, by driving the metering motor 14, it is possible to rotate the injection screw 13a around an axis along with the coupling shaft 13c to meter the molten resin within the heating cylinder 13b. Additionally, the metering motor 14 is enabled to approach or separate from the stationary mold 3 along with the injection apparatus 5 by the driving force of the injection apparatus moving cylinder 15. At this time, the metering motor 14 may be any of a hydraulic drive motor and an electric drive motor. Additionally, a speed reducer (not shown) may be provided between the metering motor 14 and the coupling shaft 13. In addition, the speed reducer is not limited in type, but may be for example a gear type, a pulley type, and a planet type. Additionally, the injection molding machine 1 includes an ejection mechanism (not shown) that ejects and removes a molded product anchored to the stationary mold 3 after being injected and solidified, and the ejection mechanism performs the above ejection operation by the driving force of the ejection cylinder 16.

As shown in FIG. 2, the hydraulic supply device 20 includes: one first main hydraulic power source 21, three auxiliary hydraulic power sources 22 and one second main hydraulic power source 23 serving as hydraulic power sources of working oil; a junction pipe 25 at which the first main hydraulic power source 21 and the auxiliary hydraulic power sources 22 join; a pressure detector 26 provided at the junction pipe 25; a first switching unit 27 that has the junction pipe 25 connected thereto and switches the supply/non-supply of working oil of some hydraulic actuators 10; and a second switching unit 28 that is connected to the second main hydraulic power source 23 and switches the supply/non-supply of working oil of the remaining hydraulic actuators 10. Here, the molding machine control unit 50 also serves as a hydraulic control unit that determines operation/stop and flow rate and pressure during operation with respect to the first main hydraulic power source 21, the auxiliary hydraulic power sources 22, and the second main hydraulic power source 23 in the hydraulic supply device 20.

The first main hydraulic power source 21 includes a first constant rotational speed motor 210 that rotates at a constant rotational speed, a first main hydraulic pump 211 that is driven by the rotational driving of the first constant rotational speed motor 210 to discharge working oil, a first main discharge pipe 212 through which the working oil discharged from the first main hydraulic pump 211 flows, and a first main control unit 213 that controls the first main hydraulic pump 211. In addition, in the present embodiment, the check valve is not provided at the first main discharge pipe 212 in order to reduce the flow resistance of a discharge oil flow and stabilize the control of a discharge oil flow. However, when priority is given to pump protection rather than the reduction of flow resistance of a discharge oil flow and the stability of the control of a discharge oil flow, the check valve may be provided at the first main discharge pipe 212. The first main discharge pipe 212 is connected to the junction pipe 25. The first constant rotational speed motor 210, which is a three-phase induction motor in the present embodiment, rotates at a fixed rotational speed according to the frequency of a three-phase alternating current to be input.

Additionally, the first main hydraulic pump 211, which is a variable capacity pump, includes a swash plate 214 that is rotatable at a constant rotational speed around a central axis by the first constant rotational speed motor 210 and is capable of changing an inclination angle from the central axis, a piston (not shown) that strokes based on the rotation of the swash plate 214 to discharge working oil, an angle adjustor 215 that adjusts the angle of the swash plate 214, and an angle detector 216 that detects the angle of the swash plate 214. The angle adjustor 215 includes a spring 215a that biases the swash plate 214, an angle adjusting hydraulic actuator 215b that changes the inclination angle of the swash plate 214 with respect to the biasing of the spring 215a, and an electromagnetic direction switching valve 215c that controls the supply of oil to the hydraulic actuator 215b. The first main control unit 213 controls the electromagnetic direction switching valve 215c of the angle adjustor 215 to supply oil to actuate the angle adjusting hydraulic actuator 215b to adjust the angle of the swash plate 214, based on a pressure command or a flow rate command input from the molding machine control unit 50, so as to obtain a predetermined pressure or flow rate, and feedback-controls the inclination angle of the swash plate 214 based on the detection result of the angle detector 216. At this time, it is preferable to perform the feedback control in order to enhance the control precision of the inclination angle of the swash plate 214. However, when a large flow rate of oil, such as 50% or more of pump rating, is discharged and a minute flow rate control (high-precision swash plate angle control) is not required, an open loop control may be performed. Since a load on the hydraulic control unit can be reduced by performing the open loop control, the risk of malfunction or failure caused by generation of heat of the control unit can be suppressed, and the angle detector 216 that detects the angle of the swash plate 214 becomes unnecessary, and costs can be reduced.

Additionally, in the present embodiment, the hydraulic supply device 20 includes the three hydraulic power sources of the first auxiliary hydraulic power source 22-1, the second auxiliary hydraulic power source 22-2, and the third auxiliary hydraulic power source 22-3, as the auxiliary hydraulic power sources 22, as described above. Each auxiliary hydraulic power source 22 includes a servo motor 220, a servo control circuit 221 that performs the rotational speed control of the servo motor 220, an auxiliary hydraulic pump 222 that is driven by the rotational driving of the servo motor 220 to discharge working oil, an auxiliary discharge pipe 223 through which the working oil discharged from the auxiliary hydraulic pump 222 flows, a check valve 224 that is provided at the auxiliary discharge pipe 223 to regulate the inflow of working oil to the auxiliary hydraulic pump 222, and an auxiliary control unit 225 that controls the auxiliary hydraulic pump 222. The auxiliary discharge pipe 223 is connected to the junction pipe 25. The auxiliary hydraulic pump 222 is a fixed capacity pump in the present embodiment, for example, a gear pump, a piston pump, a vane pump, a volute pump, or the like.

Additionally, in the auxiliary hydraulic power source 22, the servo motor 220 has an encoder that detects rotation angle, and the detected rotation angle is output to the servo control circuit 221. The auxiliary control unit 225 outputs a rotational speed command to the servo control circuit 221, wherein the rotational speed command as a rotational speed which becomes a predetermined pressure or flow rate, based on a pressure command or a flow rate command input from the molding machine control unit 50. The servo control circuit 221 generates a pulse signal corresponding to the input rotational speed command, outputs the pulse signal to the servo motor 220, and rotationally drives the servo motor 220 at a rotational speed corresponding to the rotational speed command. The rotation angle detected by the encoder of the servo motor 220 is input to the servo control circuit 221, and the servo control circuit 221 controls the servo motor 220 so as to obtain the corresponding rotational speed while performing feedback correction based on the rotation angle concerned.

The respective auxiliary hydraulic power sources 22 include the above individual components, respectively and are distinguished from each other by giving sub-numbers of 1 to 3 to the reference numerals. That is, the first auxiliary hydraulic power source 22-1 includes a first servo motor 220-1, a first servo control circuit 221-1, a first auxiliary hydraulic pump 222-1, a first auxiliary discharge pipe 223-1, a first check valve 224-1, and a first auxiliary control unit 225-1. The second auxiliary hydraulic power source 22-2 includes a second servo motor 220-2, a second servo control circuit 221-2, a second auxiliary hydraulic pump 222-2, a second auxiliary discharge pipe 223-2, a second check valve 224-2, and a second auxiliary control unit 225-2. The third auxiliary hydraulic power source 22-3 includes a third servo motor 220-3, a third servo control circuit 221-3, a third auxiliary hydraulic pump 222-3, a third auxiliary discharge pipe 223-3, a third check valve 224-3, and a third auxiliary control unit 225-3. In addition, the specifications of the individual components of the three auxiliary hydraulic power sources 22 are not necessarily the same, for example, the capacities of the auxiliary hydraulic pumps 222 may be different from one another, and the rated outputs of the servo motors 220 may be different from each other. In the present embodiment, in order to make the embodiment easily understood, the specifications of the individual components of the three auxiliary hydraulic power sources 22 are the same.

The second main hydraulic power source 23 includes a second constant rotational speed motor 230 that rotates at a constant rotational speed, a second main hydraulic pump 231 that is driven by the rotational driving of the second constant rotational speed motor 230 to discharge working oil, a second main discharge pipe 232 through which the working oil discharged from the second main hydraulic pump 231 flows, and a second main control unit 233 that controls the second main hydraulic pump 231. The second main discharge pipe 232 is connected to the second switching unit 28. The second constant rotational speed motor 230, which is a three-phase induction motor in the present embodiment, rotates at a fixed rotational speed according to the frequency of a three-phase alternating current to be input.

Additionally, the second main hydraulic pump 231, which is a variable capacity pump, includes a swash plate 234 that is rotatable at a constant rotational speed around a central axis by the second constant rotational speed motor 230 and is capable of changing an inclination angle from the central axis, a piston (not shown) that strokes corresponding to the rotation of the swash plate 234, an angle adjustor 235 that adjusts the angle of the swash plate 234, and an angle detector 236 that detects the angle of the swash plate 234. The angle adjustor 235 includes a spring 235a that biases the swash plate 234, a hydraulic angle adjusting actuator 235b that changes the inclination angle of the swash plate 234 against the biasing of the spring 235a, and an electromagnetic direction switching valve 235c that controls the supply of oil to the hydraulic actuator 235b. The second main control unit 233 controls the electromagnetic direction switching valve 235c of the angle adjustor 235 to supply oil based on a pressure command or a flow rate command input from the molding machine control unit 50, so as to obtain a predetermined pressure or flow rate. The second main control unit 233 actuates the angle adjusting hydraulic actuator 235b to adjust the angle of the swash plate 234.

Here, as the first constant rotational speed motor 210 of the first main hydraulic power source 21 or a second constant rotational speed motor 230 of the second main hydraulic power source 23, a three-phase induction motor is most preferable in practice from viewpoints of high heat resistance, simple structure, maintainability, long service life, and the like. However, any of a single-phase induction motor, a direct current motor, a synchronous motor, an AC commutator motor, a high-efficiency motor, and the like may be used so long as the frequency control of a current by current switching using a power element is not performed. Additionally, as a speed (rotational speed) control method when the three-phase induction motor is used, any method of control by an external resistance value, control by the number of poles, and control by a voltage may be used so long as the rotational speed is constantly controlled.

Additionally, as the servo motor 220 of the auxiliary hydraulic power source 22, an AC servo motor is most preferable since the AC motor is low-priced and easily increased in size and output power. However, any types of motors, such as a DC servo motor and or a stepping motor, may be used arbitrarily so long as the motors can be used for applications where position, speed, and the like are controlled in a servo mechanism. Additionally, with respect to structure, for example, stator structure may be any of a distributed winding type and a concentrated winding type, and rotor structure may be any of a surface permanent magnet (SPM) motor and an interior permanent magnet (IPM) motor. Here, in order to obtain large discharge capacity with a small hydraulic pump in the rotor structure, the IPM motor is more preferable, which can utilize a reluctance torque component in addition to a magnet torque component as an effective torque while performing an equivalent field-weakening control and suppressing a voltage and can be operated in a high rotation region of a rated speed value or more without causing torque reduction (reduction in hydraulic pressure capable of being generated) in a high-speed zone.

Additionally, the auxiliary hydraulic pump 222 of the auxiliary hydraulic power source 22 is not limited to a fixed capacity hydraulic pump, but may be a variable capacity pump, and may be an arbitrary hydraulic pump that can be operated with one or a plurality of preset specific capacities and can control the discharge amount of working oil by the rotational speed control in the setting of the specific capacity concerned.

The mold opening and closing cylinder 11, the mold clamping cylinder 12, the injection cylinder 13, and the metering motor 14 are connected to the first switching unit 27 as the hydraulic actuators 10. Accordingly, the first main hydraulic power source 21 and the auxiliary hydraulic power sources 22 connected to the first switching unit 27 via the junction pipe 25 are enabled to supply working oil to the mold opening and closing cylinder 11, the mold clamping cylinder 12, the injection cylinder 13, or the metering motor 14 based on the switching of the first switching unit 27.

Additionally, the injection apparatus moving cylinder 15 and the ejection cylinder 16 are connected to the second switching unit 28 as the hydraulic actuators 10. Accordingly, the second main hydraulic power source 23 connected to the second switching unit 28 is enabled to supply working oil to the injection apparatus moving cylinder 15 or the ejection cylinder 16 based on the switching of the second switching unit 28. Additionally, although an example of the present embodiment has been described above in which the working oil discharged from one variable capacity pump 231 is switched by the second switching unit 28 and supplied to the injection apparatus moving cylinder 15 and to the ejection cylinder 16, the working oil discharged from one variable capacity pump may not be switched and supplied to the injection apparatus moving cylinder 15 and the ejection cylinder 16, but working oil may be supplied to the injection apparatus moving cylinder 15 and to the ejection cylinder 16 through different hydraulic circuits, respectively. Specifically, in addition to the variable capacity pump 231 provided at one end of a rotating shaft of the second constant rotational speed motor 230, a variable capacity hydraulic pump (not shown) may be provided at the other end of the rotating shaft of the second constant rotational speed motor 230, the injection apparatus moving cylinder 15 may be connected to the variable capacity pump 231 at one end, and the ejection cylinder 16 may be connected to the variable capacity pump at the other end so that the injection apparatus moving cylinder 15 and the ejection cylinder 16 are constituted by separate hydraulic circuits. In this case, it is possible to drive two variable capacity pumps by one second constant rotational speed motor 230 to independently supply working oil to the injection apparatus moving cylinder 15 and the ejection cylinder 16, respectively, and the parallel operation of the injection apparatus moving cylinder 15 and the ejection cylinder 16 can be performed. Moreover, pressures or flow rates may be adjusted, respectively, by independently controlling the swash plate angles of the respective variable capacity pumps. In this case, in order not to break a molded product during ejection operation, it is preferable that the variable capacity pump connected to the ejection cylinder 16 perform pressure control and flow rate control. However, the variable capacity pump connected to the injection apparatus moving cylinder 15 that performs the movement operation of the injection apparatus that does not definitely require speed control may perform only the pressure control.

In addition, although the present embodiment has shown an example in which the injection apparatus moving cylinder 15 and the ejection cylinder 16 are connected to the second main hydraulic power source 23, the injection apparatus moving cylinder 15 and the ejection cylinder 16 may be connected to the first main hydraulic power source 21 and the auxiliary hydraulic power sources 22 via the first switching unit 27 and the junction pipe 24 when the mold opening and closing operation of the mold by the mold opening and closing cylinder 11, the operation of metering the molten resin within the heating cylinder 13b by the metering motor 14, the operation of moving the injection apparatus 5, or the operation of ejecting a molded product of the mold do not need to be performed in parallel. In this case, the first main hydraulic power source 21 and the auxiliary hydraulic power sources 22 can also supply working oil to the injection apparatus moving cylinder 15 and the ejection cylinder 16 in addition to the mold opening and closing cylinder 11, the mold clamping cylinder 12, the injection cylinder 13, and the metering motor 14, based on the switching of the first switching unit 27.

Figure 3:
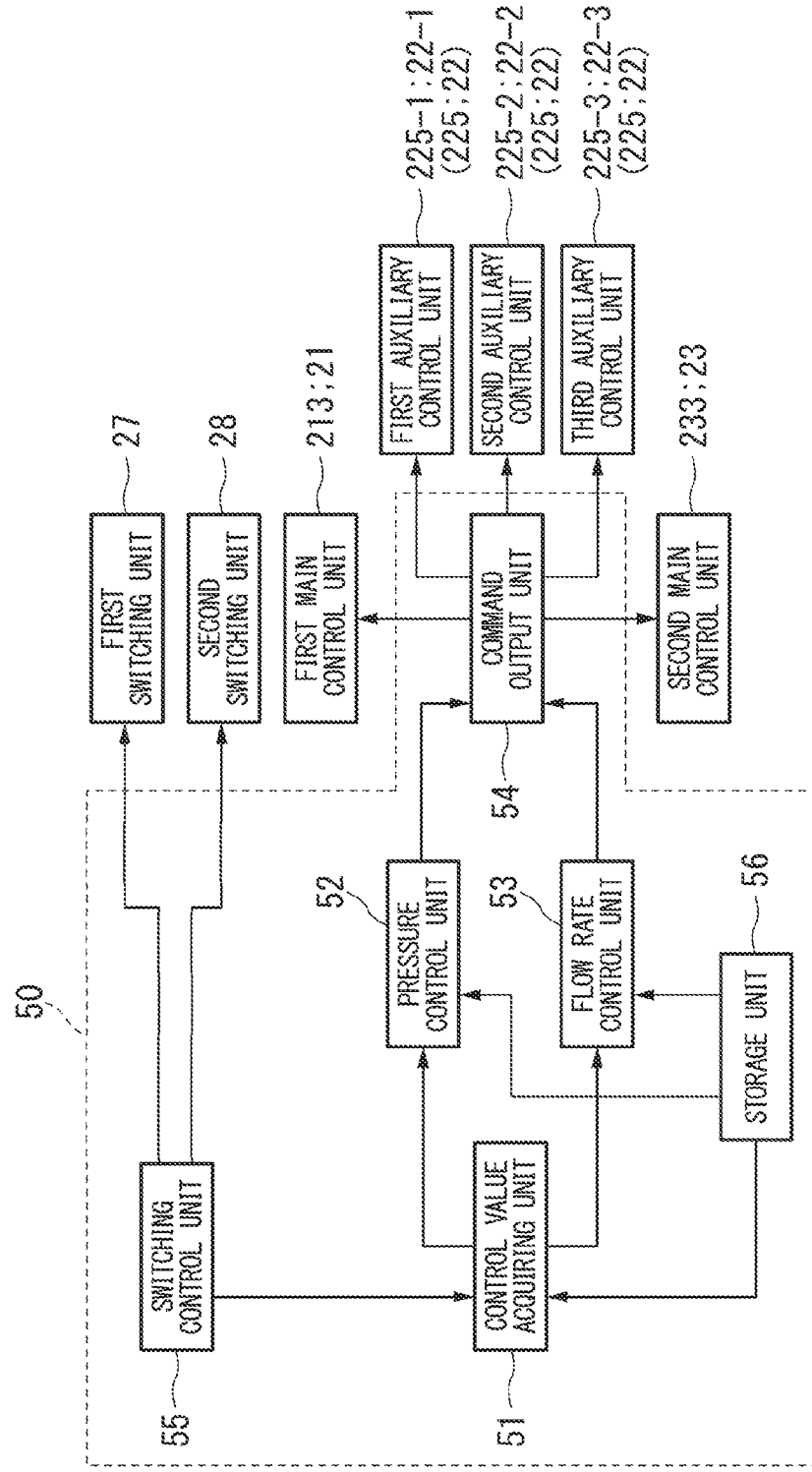
FIG. 3 is a block diagram of a molding machine control unit, in the injection molding machine according to the first embodiment of the present invention.

As shown in FIG. 3, the molding machine control unit 50 that also serves as the hydraulic control unit in the hydraulic control device 20 includes a control value acquiring unit 51 that acquires a pressure control value of corresponding hydraulic actuators 10 or a flow rate control value of the corresponding hydraulic actuators, a pressure control unit 52 that generates a pressure command for the first main hydraulic power source 21, the auxiliary hydraulic power sources 22, and the second main hydraulic power source 23 when a pressure control value is input from the control value acquiring unit 51, a flow rate control unit 53 that generates a flow rate command for the first main hydraulic power source 21, the auxiliary hydraulic power sources 22, and the second main hydraulic power source 23 when the flow rate control value is input from the control value acquiring unit 51, a command output unit 54 that outputs the pressure command generated in the pressure control unit 52 or the flow rate command generated in the flow rate control unit 53, a switching control unit 55 that controls the first switching unit 27 and the second switching unit 28, and a storage unit 56 that stores various data.

The switching control unit 55 controls the first switching unit 27 and the second switching unit 28 to switch the connection between corresponding hydraulic actuators 10 and hydraulic power sources at a predetermined timing, based on an operation command input from the outside. For example, during a timing where any one of a mold clamping step of closing a mold, a mold clamping step of clamping the mold, a metering step of metering molten resin to be injected into the cavity 4, an injection step of injecting the molten resin within the cavity 4, an injection pressure maintaining step of maintaining a predetermined pressure for a given period of time after injection, and a mold opening step of opening the mold is executed, the first switching unit 27 is connected to any one or a plurality of selected hydraulic actuators 10 of the mold opening and closing cylinder 11, the mold clamping cylinder 12, the metering motor 14, and the injection cylinder 13, which is a hydraulic actuator 10 corresponding to the step, so as to bring about a state where hydraulic pressure is capable of being input by the first main hydraulic power source 21 and the auxiliary hydraulic power sources 22.

Additionally, during a timing where any of an injection apparatus advancing step of advancing the injection apparatus 5 to the stationary mold 3, an ejecting step of ejecting a molded product from the stationary mold 3, an injection apparatus retreating step of retreating the injection apparatus 5 from the stationary mold 3, the second switching unit 28 is connected to any of the injection apparatus moving cylinder 15, and the ejection cylinder 16, which is a hydraulic actuator 10 corresponding to the step, so as to bring about a state where hydraulic pressure is capable of being input by the second main hydraulic power source 23.

In addition, with respect to steps that can be simultaneously executed among the above steps, hydraulic actuators 10 corresponding to the steps, respectively, can be simultaneously actuated. For example, the mold clamping step and the injection apparatus 5 advancing step can be simultaneously executed. The molding machine control unit 50 may operate the first main hydraulic power source 21 and a selected auxiliary hydraulic power source 22 to actuate the mold clamping cylinder 12 in order to carry out the mold clamping step and may operate the second main hydraulic power source 23 to actuate the injection apparatus moving cylinder 15 in order to carry out the injection apparatus 5 advancing step.

The control value acquiring unit 51 acquires an operation command input to the switching control unit 55 as step information, and acquires a pressure control value or a flow rate control value corresponding to the step information from the storage unit 56. A pressure control value or a flow rate control value for obtaining driving forces required for the hydraulic actuators 10 in correspondence with each step is stored in the storage unit 56. In addition, the control value acquiring unit 51 may acquire a pressure control value or a flow rate control value (the operation speeds of a corresponding hydraulic actuator 10) from an input unit, such as a control panel, as a user inputs the pressure control value or the flow rate control value to the input unit. When the control value acquiring unit 51 has acquired a pressure control value, the acquired pressure control value, and step information are output to the pressure control unit 52. On the other hand, when the control value acquiring unit 51 has acquired a flow rate control value, the acquired flow rate control value and step information are output to the flow rate control unit 53.

Next, the details of the pressure control unit 52 and the flow rate control unit 53 and the details of the pressure control and flow rate control by the control units, respectively, will be described. First, the pressure control unit 52 and the details of the pressure control by the pressure control unit 52 will be described.

Figure 4:
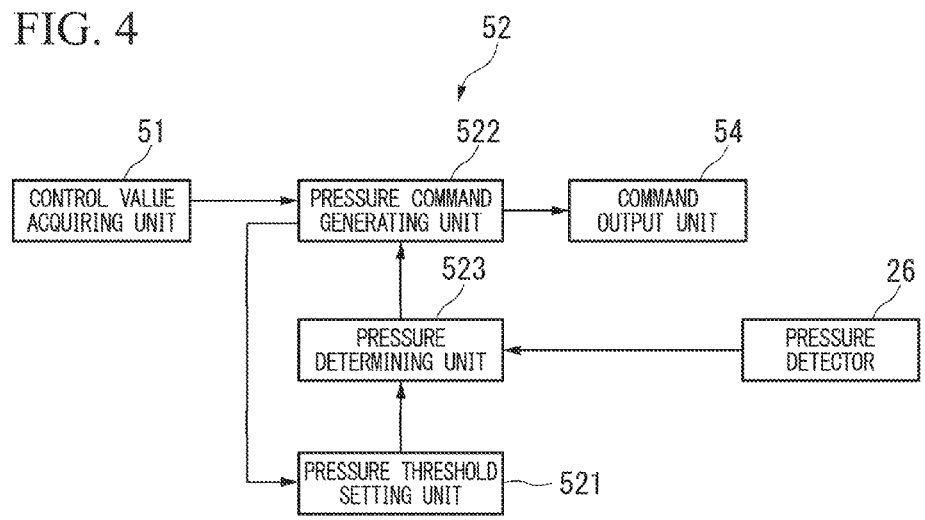
FIG. 4 is a block diagram of a pressure control unit of the molding machine control unit, in the injection molding machine according to the first embodiment of the present invention.

As shown in FIG. 4, the pressure control unit 52 has a pressure threshold setting unit 521 that sets a pressure threshold lower than a pressure control value in correspondence with each auxiliary hydraulic power source 22 based on the pressure control value, a pressure command generating unit 522 that generates and outputs a pressure command corresponding to the pressure control value, and a pressure determining unit 523 that determines whether or not the pressure of working oil detected by the pressure detector 26 is equal to or more than the pressure threshold set by the pressure threshold setting unit 521. The pressure detected by the pressure detector 26 is input to the pressure determining unit 523.

Next, a control flow by the pressure control unit 52 will be described.

Figure 5:
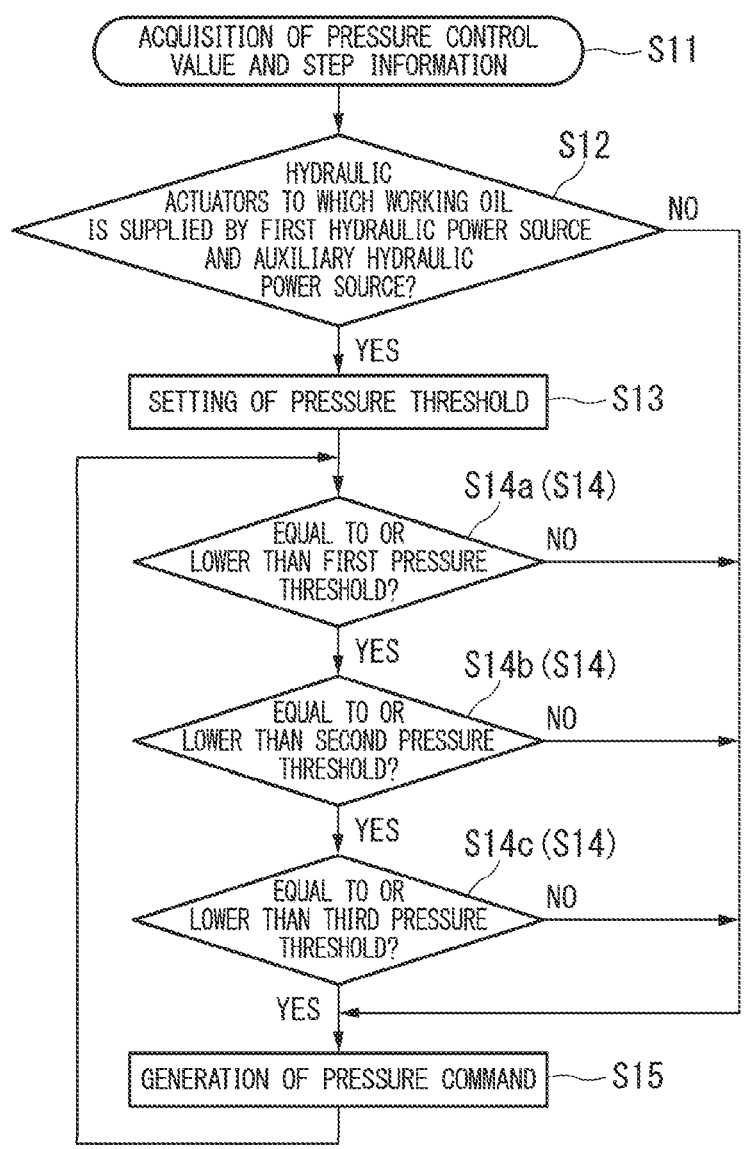
FIG. 5 is a flow diagram showing the details of a pressure control in the injection molding machine according to the first embodiment of the present invention.

As shown in FIG. 5, in a pressure control value receiving step S11, a pressure control is started if a pressure control value and step information are input from the control value acquiring unit 51 to the pressure command generating unit 522. Then, in an operation target determining step S12, the pressure command generating unit 522 refers to the received step information, and determines whether or not there are the hydraulic actuators 10 to which working oil is supplied by the first main hydraulic power source 21 and the auxiliary hydraulic power sources 22. Then, when it is determined that there are the hydraulic actuators 10 to which working oil is supplied by the first main hydraulic power source 21 and the auxiliary hydraulic power sources 22 (YES), the pressure command generating unit 522 outputs the pressure control value to the pressure threshold setting unit 521, and shifts to a pressure threshold setting step S13.

On the other hand, when there are not the hydraulic actuators 10 to which working oil is supplied by the first main hydraulic power source 21 and the auxiliary hydraulic power sources 22, that is, it is determined that there are the hydraulic actuators 10 to which working oil is supplied by the second main hydraulic power source 23 (NO), in a pressure command generating step S15, a pressure command corresponding to the pressure control value is generated and output to the command output unit 54 along with the step information. Then, the command output unit 54 outputs the pressure commands to the second main control unit 233 of the second main hydraulic power source 23 based on the step information. For this reason, in the second main hydraulic power source 23, the second main control unit 233 executes the pressure control at a pressure corresponding to the input pressure command.

Additionally, when it is determined that there are the hydraulic actuators 10 to which working oil is supplied by the first main hydraulic power source 21 and the auxiliary hydraulic power sources 22 in the operation target determining step S12 as above (YES), the pressure threshold setting step S13 is executed. In the pressure threshold setting step S13, the pressure threshold setting unit 521 set pressure thresholds corresponding to the respective auxiliary hydraulic power sources 22 based on the received pressure control value. Specifically, pressure difference values are preset in the pressure threshold setting unit 521. The pressure difference values may be hydraulic pressure absolute values or pressure value percentages (%). In the case of the pressure value percentages, the pressure value percentages may be percentages of a pump rated pressure, may be percentages of a pressure threshold, or may be percentages of a predetermined pressure value. Then, the pressure threshold setting unit 521 sets a first pressure threshold corresponding to the first auxiliary hydraulic power source 22-1 by using a pressure obtained by subtracting a pressure difference value from the pressure control value as a pressure threshold. Moreover, the pressure threshold setting unit 521 sets a second pressure threshold corresponding to the second auxiliary hydraulic power source 22-2 by using a pressure obtained by subtracting a pressure difference value from the first pressure threshold as a pressure threshold. Similarly, the pressure threshold setting unit 521 sets, as a pressure threshold, a third pressure threshold smaller than the second pressure threshold by a pressure difference value in correspondence with the third auxiliary hydraulic power source 22-3. Then, the pressure threshold setting unit 521 outputs the respective set pressure thresholds to the pressure determining unit 523, and shifts to the pressure determining step S14. In addition, although the pressure thresholds are set by values that are smaller than a reference value by preset pressure difference values in the above, the invention is not limited to this. The pressure thresholds may be set by values obtained by multiplying a reference pressure control value or a predetermined pressure threshold by predetermined values less than one. The pressure thresholds need only to be set to at least values smaller than the pressure control value. Additionally, there is no problem even if the respective pressure difference values have any correlation such that a pressure difference value between the pressure control value and the first pressure threshold, a pressure difference value between the first pressure threshold and the second pressure threshold, and a pressure difference value between the second pressure threshold and the third pressure threshold being all the same or having different values, respectively, or any two pressure difference values being the same and the remaining one pressure difference value being different.

In the pressure determining step S14, the pressure determining unit 523 performs magnitude comparison between the pressure detected by the pressure detector 26 and the respective pressure thresholds. First, the comparison with the largest first pressure threshold is performed (Step S14a). Then, when a pressure is higher than the first pressure threshold, a determination result of being higher than the first pressure threshold is output to the pressure command generating unit 522, and shift to the pressure command generating step S15 is made.

Additionally, when the pressure is equal to or lower than the first pressure threshold, the comparison with the next largest second pressure threshold is performed (Step S14b). Then, when the pressure is higher than the second pressure threshold, a determination result of being higher than the second pressure threshold is output to the pressure command generating unit 522, and shift to the pressure command generating step S15 is made. Similarly, the comparison with the third pressure threshold is also performed (Step S14c), and a determination result of being higher than the first pressure threshold, the second pressure threshold, or the third pressure threshold is output to the pressure command generating unit 522, or when the pressure is equal to or lower than the third pressure threshold in the magnitude comparison with the third pressure threshold, the determination result of being equal to or lower than the third pressure threshold is output to the pressure command generating unit 522. In addition, although the present embodiment shows that the pressure determining step S14 is performed in order of Step S14a, Step S14b, and Step S14c, the magnitude comparison of pressure may be performed in order of Step S14c, Step S14b, and Step S14a, and is not restricted by the order of the steps.

Next, in a pressure command generating step S15, pressure commands for the pressure command generating unit 522, the first main hydraulic power source 21, and the first auxiliary hydraulic power source 22-1, the second auxiliary hydraulic power source 22-2, the third auxiliary hydraulic power source 22-3, are generated. Here, when there is a determination of being equal to or lower than the third pressure threshold based on the determination result input from the pressure determining unit 523, the pressure command generating unit 522 generates pressure commands corresponding to the pressure control value in all of the first main control unit 213 of the first main hydraulic power source 21, the first auxiliary control unit 225-1 of the first auxiliary hydraulic power source 22-1, the second auxiliary control unit 225-2 of the second auxiliary hydraulic power source 22-2, and the third auxiliary control unit 225-3 of the third auxiliary hydraulic power source 22-3, and outputs the pressure commands to the command output unit 54 along with step information. Then, the command output unit 54 outputs the pressure commands of the first main hydraulic power source 21 and the auxiliary hydraulic power sources 22 based on the step information, and all of the first main hydraulic power source 21, the first auxiliary hydraulic power source 22-1, the second auxiliary hydraulic power source 22-2, and the third auxiliary hydraulic power source 22-3 discharge working oil so as to obtain the pressure control value.

Additionally, when there is a determination of being greater than the third pressure threshold based on the determination result input from the pressure determining unit 523, the pressure command generating unit 522 generates pressure commands corresponding to the pressure control value in the first main control unit 213 of the first main hydraulic power source 21, the first auxiliary control unit 225-1 of the first auxiliary hydraulic power source 22-1, and the second auxiliary control unit 225-2 of the second auxiliary hydraulic power source 22-2, generates a stop command instead of a pressure command for the third auxiliary control unit 225-3 of the third auxiliary hydraulic power source 22-3, and outputs these commands to the command output unit 54 along with step information. Then, the command output unit 54 outputs pressure commands or stop commands of the first main hydraulic power source 21 and the auxiliary hydraulic power sources 22 based on the step information, and all of the first main hydraulic power source 21, the first auxiliary hydraulic power source 22-1, and the second auxiliary hydraulic power source 22-2 discharge working oil so as to obtain the pressure control value, while the third auxiliary hydraulic power source 22-3 stops and does not discharge working oil.

Additionally, when there is a determination of being greater than the second pressure threshold based on the determination result input from the pressure determining unit 523, the pressure command generating unit 522 generates pressure commands corresponding to the pressure control value in the first main control unit 213 of the first main hydraulic power source 21 and the first auxiliary control unit 225-1 of the first auxiliary hydraulic power source 22-1, generates stop commands instead of pressure commands for the second auxiliary control unit 225-2 of the second auxiliary hydraulic power source 22-2 and the third auxiliary control unit 225-3 of the third auxiliary hydraulic power source 22-3, and outputs these commands to the command output unit 54 along with step information. Then, the command output unit 54 outputs pressure commands or stop commands of the first main hydraulic power source 21 and the auxiliary hydraulic power sources 22 based on the step information, and all of the first main hydraulic power source 21, and the first auxiliary hydraulic power source 22-1 discharge working oil so as to obtain the pressure control value, while the second auxiliary hydraulic power source 22-2 and the third auxiliary hydraulic power source 22-3 stop and do not discharge working oil.

Moreover, when there is a determination of being greater than the first pressure threshold based on the determination result input from the pressure determining unit 523, the pressure command generating unit 522 generates a pressure command corresponding to the pressure control value in the first main control unit 213 of the first main hydraulic power source 21, generates stop commands instead of the pressure commands in the respective auxiliary control units 225 of the auxiliary hydraulic power sources 22, and outputs these commands to the command output unit 54 along with step information. Then, the command output unit 54 outputs the pressure commands or stop commands to the first main hydraulic power source 21 and the auxiliary hydraulic power sources 22 based on the step information, and only the first main hydraulic power source 21 discharges working oil so as to obtain the pressure control value, while all the auxiliary hydraulic power sources 22 stop and do not discharge working oil.

Then, the pressure control unit 52 repeats the pressure determining step S14 and the pressure command generating step S15 based on pressures input from the pressure detector 26 at constant time intervals and updates pressure commands or stop commands to be output to the first main hydraulic power source 21 and the auxiliary hydraulic power sources 22. In addition, when a new pressure control value is input, a start is made again from the pressure control value receiving step S1.

Figure 6:
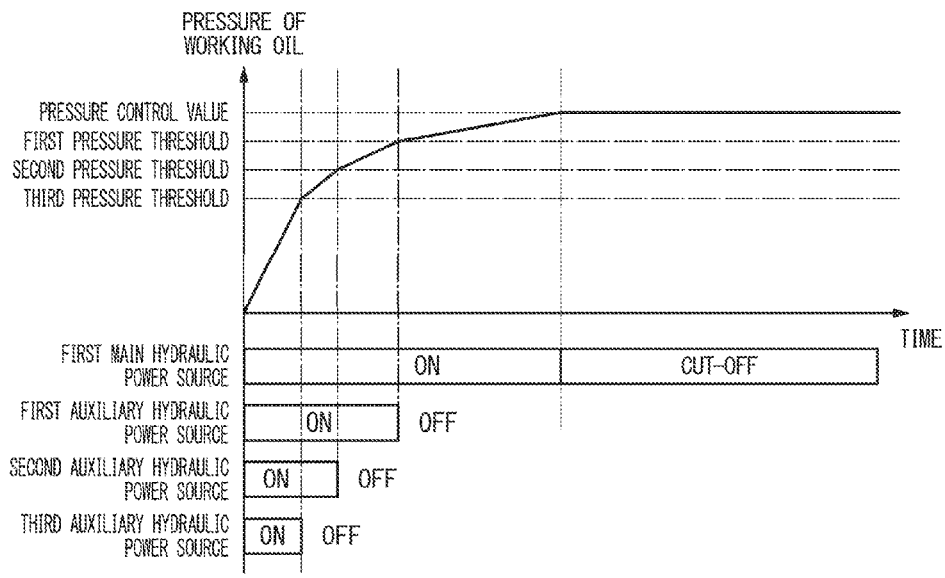
FIG. 6 is a graph showing the relationship between time and pressure illustrating the pressure control in the injection molding machine according to the first embodiment of the present invention.

FIG. 6 shows a pattern of the pressure control based on the above pressure control flow.

As shown in FIG. 6, immediately after a pressure control value and a flow rate control value are input, and working oil begins to be discharged so as to obtain the flow rate control value, a pressure detected by the pressure detector 26 is low, and working oil is discharged from all of the first main hydraulic power source 21, the first auxiliary hydraulic power source 22-1, the second auxiliary hydraulic power source 22-2, and the third auxiliary hydraulic power source 22-3. For this reason, the flow rate of working oil can be rapidly raised at a fast response speed toward the flow rate control value. On the other hand, as the flow rate of working oil increases, the pressure of the working oil becomes higher. As a result, if the pressure detected by the pressure detector 26 reaches the third pressure threshold, the third auxiliary hydraulic power source 22-3 stops, and if the pressure reaches the second pressure threshold, the second auxiliary hydraulic power source 22-2 stops further. As a result, the number of auxiliary hydraulic power sources 22 operating decreases sequentially. Here, in each of the auxiliary hydraulic power sources 22, the check valve 224 is provided at the auxiliary discharge pipe 223 connected to the junction pipe 25. Therefore, even if an auxiliary hydraulic power source stops, the working oil discharged from other hydraulic power sources that are operating does not flow back.

Then, working oil is finally supplied with the pressure control value only by the first main hydraulic power source 21. The first main control unit 213 of the first main hydraulic power source 21 supplies oil to the hydraulic actuator 215, and feedback-controls a swash plate angle so that the swash plate angle is maintained at a predetermined angle up to the pressure control value. If the pressure detected by the pressure detector 26 reaches the pressure control value, the first main control unit 213 controls the electromagnetic direction switching valve 215c to stop the supply of the oil to the hydraulic actuator 215b. Therefore, the first main hydraulic pump 211 is operated so that the discharge of the oil from the first main hydraulic pump 211 is cut off and becomes constant at the pressure concerned. Additionally, when the pressure control value is input, the above control flow is repeatedly executed. If the pressure of working oil drops abruptly and a required amount of working oil has increased abruptly for a certain reason, some or all of the auxiliary hydraulic power sources 22 operate again, based on the relationship between the detected pressure and the respective pressure thresholds according to the above control flow, and the flow rates are recovered. At this time, since the driving sources of the auxiliary hydraulic power sources 22 are the servo motors 220, the pumps can be rapidly rotated at a predetermined rotational speed to recover the flow rate of working oil to the flow rate control value. For this reason, operation can be controlled without impairing the continuity of the hydraulic actuators 10.

Additionally, generally, when the discharge oil amount of an auxiliary hydraulic power source is suppressed during a pressure control, the auxiliary hydraulic power source continues operation. Therefore, for example, in the case of a state where the load resistance of a hydraulic actuator fluctuates easily, such as just before the working oil pressure of the hydraulic actuator reaches a pressure control value in the pressure control, there is concern that a phenomenon in which a hydraulic pressure on the side of a main hydraulic power source fluctuates and intermittently falls below the hydraulic pressure of the auxiliary hydraulic power source may occur. In this case, a check valve may be opened and the auxiliary hydraulic power source may communicate with the hydraulic actuator. Thus, the oil to be supplied to the hydraulic actuator fluctuates and vibrates in the case of only the main hydraulic power source and in the case of the main hydraulic power source and the auxiliary hydraulic power source, and stable control cannot be performed. In contrast, since the auxiliary hydraulic power sources 22 stop in the invention, even when the pressure of the first main hydraulic power source 21 drops, there is no case in which the check valve 224 opens and the auxiliary hydraulic power sources 22 communicate with the hydraulic actuator 10, and stable control can be performed. Moreover, since the oil amount drops sequentially before hydraulic pressures reach the pressure control value during the pressure control, generation of a surge pressure (overshoot of the pressure) when the hydraulic pressures have reached the pressure control value can be suppressed.

Figure 7:
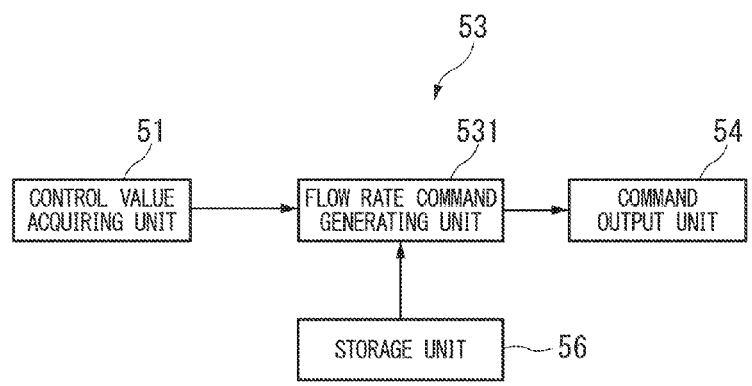
FIG. 7 is a block diagram of a flow rate control unit of the molding machine control unit, in the injection molding machine according to the first embodiment of the present invention.
Figure 8:
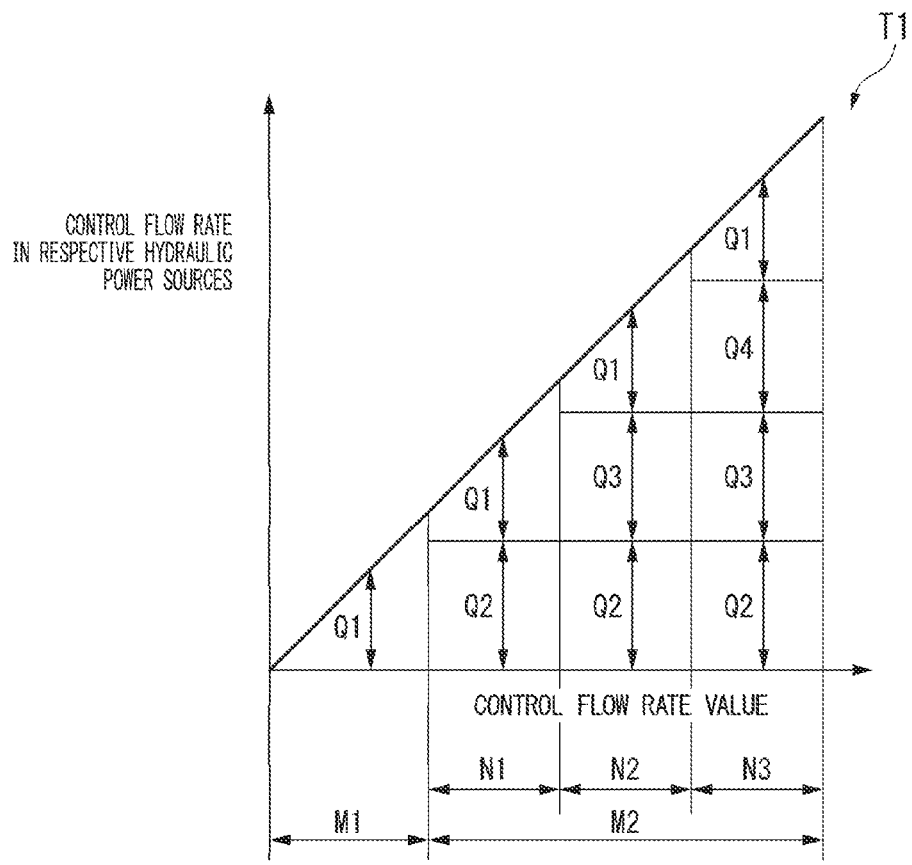
FIG. 8 is an explanatory view illustrating a table to be referred to in a flow rate control in the injection molding machine according to the first embodiment of the present invention.

Next, the flow rate control unit 53 and the details of the flow rate control by the flow rate control unit 53 will be described. As shown in FIG. 7, the flow rate control unit 53 has a flow rate command generating unit 531 which refers to a table stored in the storage unit 56 and generates flow rate commands corresponding to the first main hydraulic power source 21 and the auxiliary hydraulic power sources 22, respectively, based on a flow rate control value. FIG. 8 shows a table T1 stored in the storage unit 56. Table T1 shows the relationship between the flow rate control value and control flow rates that are flow rates to be controlled by the respective hydraulic power sources. Table T1 generally has a first flow rate range M1 that is a range of a flow rate where only the first main hydraulic power source 21 is operated, and a second flow rate range P2 that is a range of a flow rate that is set to a greater flow than the first flow rate range M1 and where the first main hydraulic power source 21 and the auxiliary hydraulic power sources 22 are operated.

In the first flow rate range M1, a flow rate that becomes a flow rate control value is allocated as a flow rate Q1 of the first main hydraulic power source 21. Additionally, the second flow rate range M2 is divided into a first stage N1, a second stage N2, and a third stage N3, and stages equivalent to the number of the auxiliary hydraulic power sources 22. In the first stage N1 with a smallest flow rate, the first auxiliary hydraulic power source 22-1 also operates along with the first main hydraulic power source 21. A preset constant flow rate Q2 shown in Table T1 is allocated to the first auxiliary hydraulic power source 22-1. Additionally, the flow rate Q1 corresponding to the shortfall in the flow rate of working oil allocated to the first auxiliary hydraulic power source 22-1 selected for the flow rate control value is allocated to the first main hydraulic power source 21. For this reason, the flow rate Q1 allocated to the first main hydraulic power source 21 changes based on the flow rate control value.

In the second stage N2 with the next greatest flow rate, the second auxiliary hydraulic power source 22-2 also operates along with the first main hydraulic power source 21 and the first auxiliary hydraulic power source 22-1. Preset constant flow rates Q2 and Q3 shown in Table T1 are allocated to the first auxiliary hydraulic power source 22-1 and the second auxiliary hydraulic power source 22-2, respectively. Additionally, the flow rate Q1 corresponding to the shortfall in the flow rate of working oil allocated to the first auxiliary hydraulic power source 22-1 and the second auxiliary hydraulic power source 22-2 selected for the flow rate control value is allocated to the first main hydraulic power source 21. For this reason, the flow rate Q1 allocated to the first main hydraulic power source 21 changes based on the flow rate control value.

In the third stage N3 with the next greatest flow rate, the third auxiliary hydraulic power source 22-3 also operates along with the first main hydraulic power source 21, the first auxiliary hydraulic power source 22-1, and the second auxiliary hydraulic power source 22-2. Preset constant flow rates Q2, Q3 and Q4 shown in Table T1 are allocated to the first auxiliary hydraulic power source 22-1, the second auxiliary hydraulic power source 22-2, and the third auxiliary hydraulic power source 22-3, respectively. Additionally, the flow rate Q1 corresponding to the shortfall in the flow rate of working oil allocated to the first auxiliary hydraulic power source 22-1, the second auxiliary hydraulic power source 22-2, and the third auxiliary hydraulic power source 22-3 selected for the flow rate control value is allocated to the first main hydraulic power source 21. For this reason, the flow rate Q1 allocated to the first main hydraulic power source 21 changes based on the flow rate control value.

Next, the control flow of the flow rate control is shown.

Figure 9:
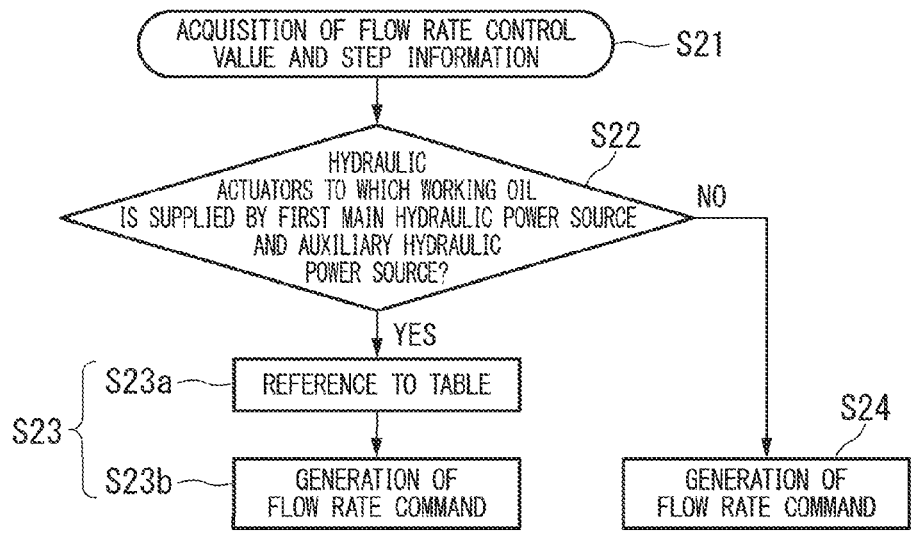
FIG. 9 is a flow diagram showing the details of the flow rate control in the injection molding machine according to the first embodiment of the present invention.

As shown in FIG. 9, in a flow rate control value receiving step S21, a flow rate control is started if a flow rate control value and step information are input from the control value acquiring unit 51 to the flow rate command generating unit 531. Then, in an operation target determining step S22, the flow rate command generating unit 531 refers to the received step information, and determines whether or not there are the hydraulic actuators 10 to which working oil is supplied by the first main hydraulic power source 21 and the auxiliary hydraulic power source 22. Then, when it is determined that there are the hydraulic actuators 10 to which working oil is supplied by the first main hydraulic power source 21 and the auxiliary hydraulic power sources 22 (YES), shift to the first flow rate command generating step S23 is made, and when it is determined that there are not the hydraulic actuators 10 to which working oil is supplied by the first main hydraulic power source 21 and the auxiliary hydraulic power sources 22, shift to the second flow rate command generating step S24 is made (NO).

In a second flow rate command generating step S24, the flow rate command generating unit 531 generates a flow rate command of a flow rate according to the flow rate control value, and outputs the flow rate command to the command output unit 54 along with step information. Then, the command output unit 54 outputs the flow rate command to the second main control unit 233 of the second main hydraulic power source 23 based on the step information. For this reason, in the second main hydraulic power source 23, in order to obtain a flow rate corresponding to the input flow rate command, the second main control unit 233 controls the angle adjustor 215 to adjust the angle of the swash plate 214 to an angle corresponding to the flow rate concerned, and thus, a flow rate control for obtaining the flow rate control value is executed.

Additionally, in the first flow rate command generating step S23, the flow rate command generating unit 531 refers to Table T1 shown in FIG. 8 (Step S23a), determines an auxiliary hydraulic power source 22 to be operated, based on the flow rate control value, determines a flow rate to be allocated to the operating auxiliary hydraulic power source 22, along with the first main hydraulic power source 21, generates a flow rate command corresponding to the flow rate concerned, and outputs the flow rate command to the command output unit 54 (step S23b). Then, the command output unit 54 outputs corresponding flow rate commands to the first main control unit 213 of the first main hydraulic power source 21 and the auxiliary control unit 225 of the selected auxiliary hydraulic power source 22, based on the step information. For this reason, in the first main hydraulic power source 21, in order to obtain a flow rate corresponding to the input flow rate command, the first main control unit 213 controls the angle adjustor 215 to adjust the angle of the swash plate 214 to an angle corresponding to the flow rate concerned, and thus, a flow rate control for obtaining a flow rate corresponding to the flow rate command is executed. Additionally, in the auxiliary hydraulic power source 22, the auxiliary control unit 225 outputs a rotational speed command, which gives a flow rate corresponding to the input flow rate command, to the servo control circuit 221, the servo control circuit 221 outputs a pulse signal for obtaining a rotational speed command corresponding to the rotational speed to the servo motor 220, and thereby, a flow rate control for obtaining a flow rate corresponding to the flow rate command is executed. That is, a flow rate control for obtaining the flow rate control value in the junction pipe 25 by the first main hydraulic power source 21 and the selected auxiliary hydraulic power source 22 is performed. In this way, the operation of the auxiliary hydraulic power sources 22 are limited when the flow rate control value is a low flow rate value, so that only the first main hydraulic power source 21 can be operated and the auxiliary hydraulic power sources 22 cannot be operated, particularly in the first flow rate range M1.

The following effects are exhibited in the injection molding machine 1 of the present embodiment as above.

That is, by reducing the number of hydraulic power sources operating as pressure becomes higher when a pressure control is executed, the amount of pump discharge per one hydraulic pump can be secured, the motor can be rotated at a rotational speed of a certain value or more, and thus, a decline in efficiency can be suppressed. In this way, by reducing the number of hydraulic power sources operating as pressure becomes higher, the amount of pump discharge per one hydraulic pump can be secured, the motor can be rotated at a rotational speed of a certain value or more, and thus, a decline in efficiency can be suppressed. Therefore, by rotating the motor at a low rotational speed, the hydraulic pump can be reliably prevented from having a high temperature and being damaged. Additionally, if the pressure control value is approached, a high-pressure low-flow-rate operation condition is brought about and high torque is required. However, since the auxiliary hydraulic power sources 22 do not need to perform a high-pressure low-flow-rate operation by limiting the operation of the auxiliary hydraulic power sources 22 while operating the first main hydraulic power source 21, the servo motors 220 of the auxiliary hydraulic power sources 22 can be compact. Particularly after pressure rises to the vicinity of the pressure control value, the discharge amount of working oil becomes an extremely low flow rate, but only the first main hydraulic power source 21 operates. That is, in the vicinity of the pressure control value, the pressure control is not executed by a rotational speed control using the servo motors 220 of the auxiliary hydraulic power sources 22 but executed by a cut-off control using the angle of the swash plate 214 by the variable capacity first main hydraulic pump 211. Therefore, load is not applied to the servo motors 220 of the auxiliary hydraulic power sources 22.

The operation limitation of the auxiliary hydraulic power sources 22 during the pressure control is sequentially performed with a rise in pressure. Thus, for example, in a state where the load resistance of the hydraulic actuators 10 fluctuates easily, such as just before reaching the pressure control value, even when the pressure of the first main hydraulic power source 21 drops, there is no case in which the check valve 224 opens and the auxiliary hydraulic power sources 22 communicate with the hydraulic actuators, and stable control can be performed. Moreover, since the amount of working oil decreases sequentially as the operation of the auxiliary hydraulic power sources 22 are sequentially controlled before the pressure of the working oil reaches the pressure control value during the pressure control, generation of a surge pressure when having reached the pressure control value can be suppressed.

Additionally, in the hydraulic control device 20, the auxiliary discharge pipes 223 of the auxiliary hydraulic power sources 22 are joined to the junction pipe 25 via the check valves 224. Thus, the load during the pressure control is not applied to the auxiliary hydraulic power sources 22, the load of the servo motors 220 serving as driving sources in the auxiliary hydraulic power sources 22 can be reduced, energy can be saved, an increase in the size of the servo motors 220 can be suppressed, and costs can be reduced. In addition, although the first main hydraulic power source 21 always continues operating and operates under a high-pressure low-flow-rate condition as above, the discharge amount is performed by the angle adjustment of the swash plate 214, and the rotational speed of the first constant rotational speed motor 210 that is a driving source remains constant. For this reason, an increase in energy loss caused by rotating at a low rotational speed and pump damage caused by heat generation can be reliably prevented.

In the hydraulic control device of the related art, when the hydraulic pump is driven by the servo motor 220 even in a high pressure state, the capacity of the servo motor 220 required for torque to load becomes large especially in low-speed rotation, and costs rise significantly. In contrast, in the hydraulic control device of the present embodiment, energy saving and significant cost reduction can be achieved by using constant rotational speed motors instead of the servo motors 220 as the driving sources to operate in a high pressure state, and using a variable capacity hydraulic pump as the hydraulic pumps.

As for the flow rate control and pressure control of the respective hydraulic power sources, flow rate or pressure commands are input to the control units of the respective hydraulic power sources from the molding machine control unit 50 that also serves as the hydraulic control unit and independent control is performed by the control units of the respective hydraulic power sources. Therefore, flow rate values, flow rate ratios, or pressure values allocated to the respective hydraulic power sources in advance can be feedback controlled or open-loop controlled in the respective hydraulic power sources. Therefore, since the amount of feedback signal processing or the amount of calculation processing can be reduced compared to a case where the molding machine control unit 50 controls respective hydraulic power sources by collectively detecting and calculating total flow rate or pressure after junction, or the flow rates or pressures of the respective hydraulic power surfaces, control can be performed with a fast response and with high precision.

Additionally, since the auxiliary hydraulic power sources 22 are driven by the servo motors 220, even when load pressure has dropped during the pressure control and required capacity has increased, the auxiliary hydraulic pumps 222 of the auxiliary hydraulic power sources 22 that have stopped during the pressure control can be instantaneously driven with a fast response of the servo motors 220 to discharge working oil, and operation can be controlled without impairing the continuity of hydraulic actuator operation. Moreover, when the variable capacity piston pump is adopted as the first main hydraulic pump 211 of the first main hydraulic power source 21, when the auxiliary hydraulic power sources 22 are instantaneously started and the check valves 224 open and join the first main discharge pipe 212 at the junction pipe 25, a high pressure generated in the junction pipe 25 is loaded to the swash plate 214 or the cylinder of the angle adjustor 215 that is supporting the swash plate 214 is overpowered as the working oil within a pipe and a hydraulic chamber is compressed. Thus, the setting angle of the swash plate 214 may deviate and a predetermined flow rate may not be discharged. In this case, although it is necessary to correct the angle of the swash plate 214 by feedback control, when the fixed capacity hydraulic pumps are used as the auxiliary hydraulic pumps 222 to be driven by the servo motors 220 in the auxiliary hydraulic power sources 22, predetermined discharge amount is obtained if the hydraulic pumps are driven at a predetermined rotational speed. Thus, there is no reduction in discharge flow rate caused by the deviation of the angle of the swash plate 214 like the variable piston pump, and operation can be controlled without impairing the continuity of hydraulic actuator operation while achieving a fast control response.

Particularly when gear pumps are used as the fixed capacity hydraulic pumps to be driven by the servo motors 220, the gear pumps can be used up to a high rotation zone of about 3000 rpm without generating problems, such as pump scoring or noise. Thus, even when a large discharge amount is required, for example, during a high cycle, it is possible to cope with this with small hydraulic pumps and servo motors 220, which is effective in energy saving and cost reduction (generally, the highest operation rotational speed zone of a piston pump and a vane pump is about 1700 to 2500 rpm). Additionally, since the gear pumps have low noise, even if the gear pumps are used in a high rotation zone for high cycling, operator's operability is reduced particularly by noise, and productivity is effectively improved. Additionally, since small-sized hydraulic pumps, that is, hydraulic pumps with a small amount of discharge per one rotation are used in a wide rotational speed zone, influence of a rotational speed difference exerted on variation in discharge amount is low, fine and high-precision control of the discharge amount of the hydraulic pumps is possible, and high-precision control can be performed even in minute changes of the flow rate and pressure. Moreover, the smoothness of acceleration and deceleration of the hydraulic actuators 10 are improved, and control with little operation shock is enabled.

Additionally, in the case of the hydraulic control device 20 of the injection molding machine 1 of the present embodiment, it is necessary to discharge high-pressure large-volume working oil because the first main hydraulic power source 21 is a main hydraulic power source that drives large-capacity actuators and is also independently. Thus, the first constant rotational speed motor 210 that drives the first main hydraulic pump 211 also has large capacity (for example, motor capacity is equal to or more than 30 kW). In this case, if a variable speed control (for example, inverter control) of the first constant rotational speed motor 210 is performed, the switching current of a power element that performs speed control in the control circuit also becomes large. Switching of a large current may make the power element generate heat excessively to damage the control circuit. In contrast, since the hydraulic control device of the present embodiment performs the speed control of the first constant rotational speed motor 210 with a fixed value and does not use any power element, damage of the control circuit caused by heat generation during operation can be suppressed.

Additionally, in the hydraulic control device 20 of the present embodiment, the injection apparatus moving cylinder 15 and the ejection cylinder 16 that do not require high pressure and large capacity are supplied with working oil from the second main hydraulic power source 23 that is independent of the first main hydraulic power source 21 and the auxiliary hydraulic power sources 22. Therefore, parallel operation of the mold opening step, the mold closing step, the mold clamping step or the plasticizing step, the injection apparatus advancing step, and an injection apparatus retreating step, or the ejecting step can be performed. Additionally, even when the parallel operation is performed, the flow rate control or pressure control of the mold opening step, the mold closing step, the mold clamping step, and a plasticizing step, and the flow rate control or pressure control of the injection apparatus advancing step, the injection apparatus retreating step, and the ejecting step are not influenced by each other. Thus, the precision of the respective operation controls can be improved.

In addition, when the hydraulic actuators 10 that is supplied with working oil from the first main hydraulic power source 21 and the auxiliary hydraulic power sources 22 are actuated by the flow rate control, the flow rate control unit 53 determines the flow rates of the respective hydraulic power sources with reference to Table T1 shown in FIG. 8, but the invention is not limited to this. If tables having at least the first flow rate range M1 to be operated only by the first main hydraulic power source 21, and the second flow rate range M2 that has a larger flow rate than the first flow rate range M1 where the auxiliary hydraulic power sources 22 are selectively operated along with the first main hydraulic power source 21 are given, the flow rate control can be performed by applying various patterns of tables.

Figure 10:
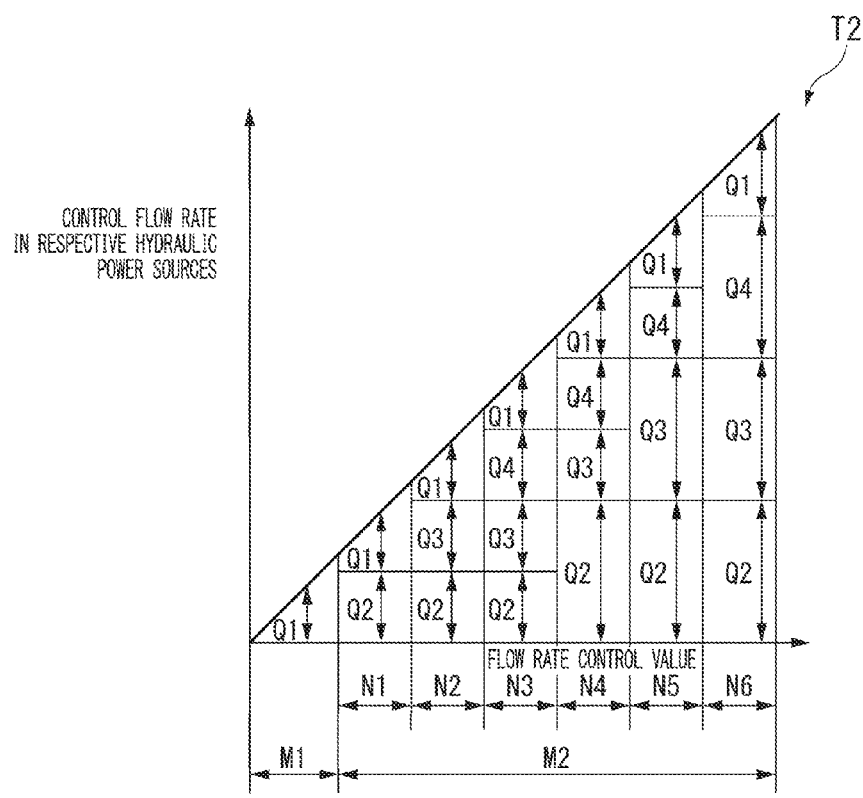
FIG. 10 is an explanatory view illustrating a table to be referred to in a flow rate control in an injection molding machine according to a first modified example of the first embodiment of the present invention.

FIG. 10 shows Table T2 in a flow rate control of a first modified example.

As shown in FIG. 10, in Table T2 of the present modified example, stage setting in the second flow rate range M2 is different and six stages are set with respect to the three auxiliary hydraulic power sources 22.

In the first stage N1 to the third stage N3, similar to Table T1 shown in FIG. 8, the number of auxiliary hydraulic power sources 22 to be sequentially operated is increased in order of the first auxiliary hydraulic power source 22-1, the second auxiliary hydraulic power source 22-2, and the third auxiliary hydraulic power source 22-3. Here, in the first stage N1 to the third stage N3, flow rates Q2, Q3, and Q4 to be discharged from the respective auxiliary hydraulic power sources 22 are set to values capable of being discharged by rotating the servo motor 220 in a region where total pump efficiency including motor efficiency and pump efficiency is high. Generally, the total pump efficiency of hydraulic power sources having hydraulic pumps particularly under the condition that load pressure is high pressure becomes the maximum efficiency at a rotational speed of about 50 percent of the allowable maximum rotational speed or rated rotational speed of the hydraulic pumps (servo motors 220). For this reason, in the first stage N1 to the third stage N3, setting is made so that flow rates corresponding to rotational speeds are allocated such that the total pump efficiency becomes equal to or more than a constant value. For example, it is preferable to allocate flow rates (rotational speeds) at which pump efficiency becomes equal to or more than 80% in a hydraulic pressure of 50 MPa or higher to be used in practice. As for rotational speeds to be used, generally, it is preferable to use 20% or more of the rated rotational speed of the pumps at which flow rates at which the total pump efficiency becomes 80% or more are obtained. Specifically, it is preferable to set flow rates corresponding to a rotational speed of 1000 to 2000 rpm. Also, setting is made so that the remaining flow rate Q1 is allocated to the first main hydraulic power source 21.

Next, in a fourth stage N4 to a sixth stage N6, all the auxiliary hydraulic power sources 22 are already operating. Thus, the flow rates Q2, Q3, and Q4 allocated sequentially from the first auxiliary hydraulic power source 22-1 are set to larger flow rates than the flow rates set in the first stage N1 to the third stages N3, within a range of flow rates equal to or less than a flow rate corresponding to the allowable maximum rotational speed. In this way, in flow rates equal to or lower than a flow rate equivalent to the third stage N3 in the second flow rate range M2, the respective hydraulic power sources can be efficiently operated, and it is possible to cope with even flow rates equal to or more than the flow rate equivalent to the third stage N3.

Figure 11:
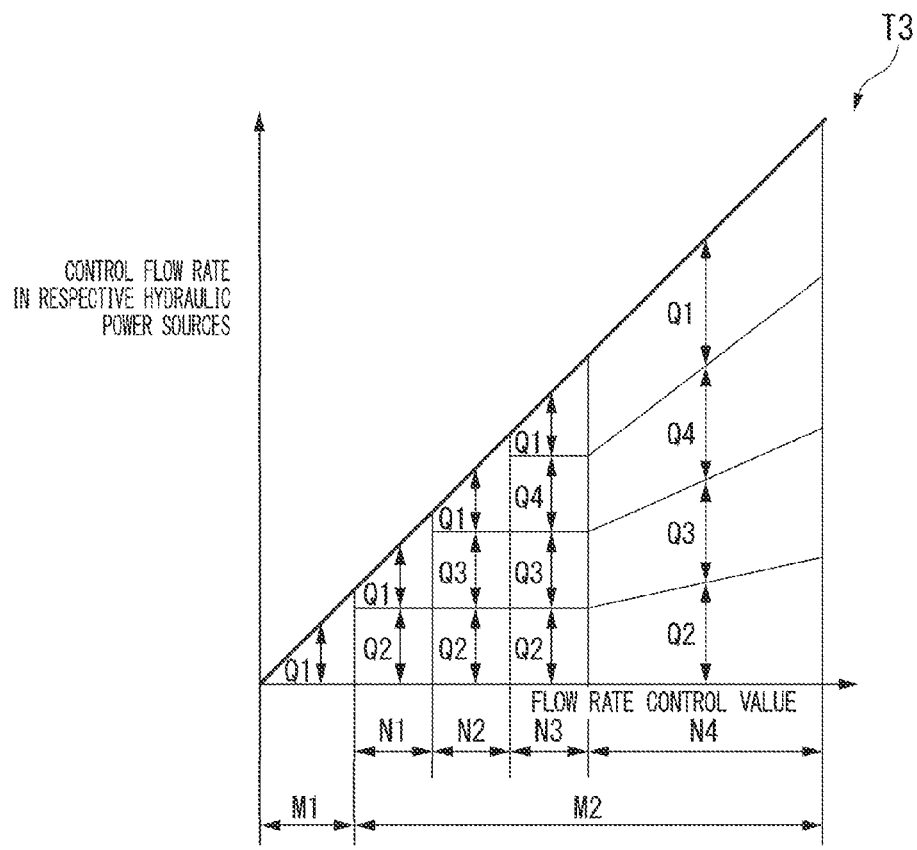
FIG. 11 is an explanatory view illustrating a table to be referred to in a flow rate control in an injection molding machine according to a second modified example of the first embodiment of the present invention.

FIG. 11 shows Table T3 in a flow rate control of a second modified example.

As shown in FIG. 11, in Table T3 of the present modified example, four stages are set with respect to the three auxiliary hydraulic power sources 22 in the second flow rate range M2. The first flow rate range M1 and the first stage N1 to the third stage N3 of the second flow rate range M2 are the same as those of Table T2 of the first modified example shown in FIG. 10.

In the present modified example, in the fourth stage N4, the flow rates Q2, Q3, and Q4 allocated to the respective auxiliary hydraulic power sources 22 are set such that a flow rate control value is proportionally distributed thereto along with the first main hydraulic power source 21, using the flow rates set in the first stage N1 to the third stage N3 as initial values. For this reason, in the fourth stage N4, flow rates to be sequentially allocated to the first main hydraulic power source 21 and the respective auxiliary hydraulic power sources 22 are increased according to the flow rate control value. Even in this way, at flow rates equal to or lower than a flow rate equivalent to the third stage N3 in the second flow rate range M2, the respective hydraulic power sources can be efficiently operated, and it is possible to cope with even flow rates equal to or more than the flow rate equivalent to the third stage N3.

Additionally, in Tables T2 and T3 of the above first and second modified examples, the flow rates allocated to the auxiliary hydraulic power sources 22 in the first stage N1 to the third stage N3 may be changed according to a pressure detected by the pressure detector 26.

Figure 12:
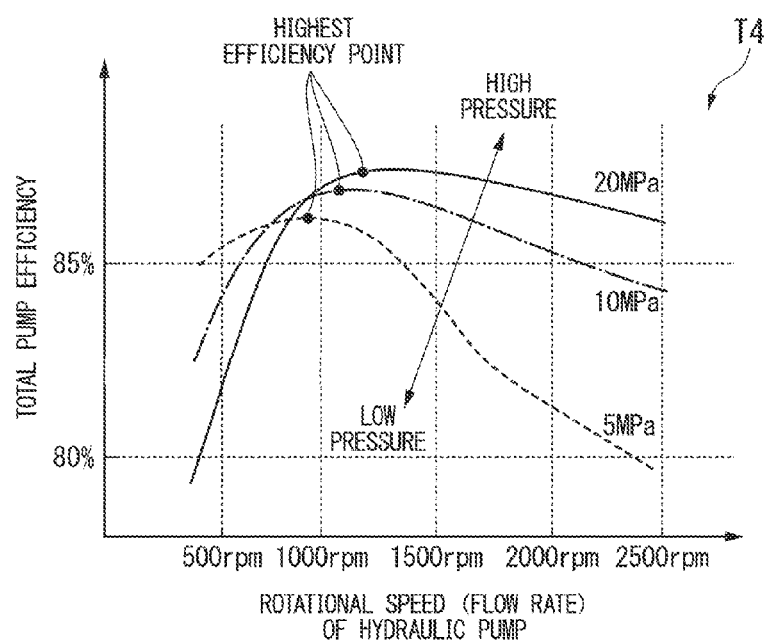
FIG. 12 is an explanatory view illustrating a table showing the relationship of pressure, the rotational speed of a hydraulic pump, and total pump efficiency, in the flow rate control in the injection molding machine according to the modified example of the first embodiment of the present invention.

The correlation of the total pump efficiency to the rotational speeds of the hydraulic pumps (servo motors 220) changes depending on the pressure of working oil. FIG. 12 shows the relationship between the rotational speed and total pump efficiency of the hydraulic pumps (servo motors 220) at respective pressures in pumps whose rated rotational speed is 2500 rpm. It can be seen that the total pump efficiency can be equal to or more than 80% by operating at a rotational speed of 500 rpm or more. Additionally, as shown in FIG. 12, it can be seen that, although a maximum efficiency point depends on the pressure and the rotational speed, and the maximum efficiency point transits to a higher rotational speed region and the value of the maximum efficiency also becomes a higher value as the pressure becomes higher, the total pump efficiency particularly in the vicinity of about 1000 rpm is obtained as high efficiency irrespective of the magnitude of the load pressure. From this, it is preferable to use a rotational speed in the vicinity of about 1000 rpm, in the first stage N1 to the third stage N3 that are frequently used in a molding operation and have a great influence on energy consumption. Moreover, at 10 MPa or more that is a pressure region to be most used in practice, it is preferable to use a rotational speed of 1000 to 2000 rpm where the total pump efficiency can be made equal to or more than 85%.

Additionally, since the maximum efficiency point changes depending on the pressure and the rotational speed, the graph as shown in FIG. 12 is stored as Table T4 in the storage unit 56, and the flow rate command generating unit 531 in the flow rate control unit 53 acquires a pressure from the pressure detector 26, and acquires the relationship between the rotational speed of a corresponding hydraulic pump (servo motor 220) and the total pump efficiency. Then, the flow rates in the first stage N1 to the third stage N3 of Table T1 stored in the storage unit 56 may be rewritten with flow rates corresponding to rotational speeds at maximum efficiency points based on the relationship concerned, and then, the flow rates allocated to the first main hydraulic power source 21 and the respective auxiliary hydraulic power sources 22 may be determined on the rewritten table T1 concerned. In this way, the efficiency can be further improved.

In addition, the usage of the graph shown in FIG. 12 is not limited to extracting a rotational speed (flow rate) corresponding to a maximum efficiency point. For example, when a plurality of stages are set for every auxiliary hydraulic power source 22 and the flow rate is sequentially increased, a range where the flow rate is increased may be set. That is, for example, in the graph shown in FIG. 12, the lower limit and upper limit of the rotational speed may be determined on the basis of a maximum efficiency point, and the flow rate may be gradually increased between the lower limit and the upper limit. Otherwise, the lower limit of the pump efficiency may be set, the lower limit and upper limit of the rotational speed corresponding to the lower limit concerned may be determined, and the flow rate may be gradually increased between the lower limit and the upper limit.

Additionally, in the above, the flow rate is determined basically with reference to one table in the flow rate control. However, the embodiment is not limited thereto, and different tables may be referred to for individual steps.

Figure 13:
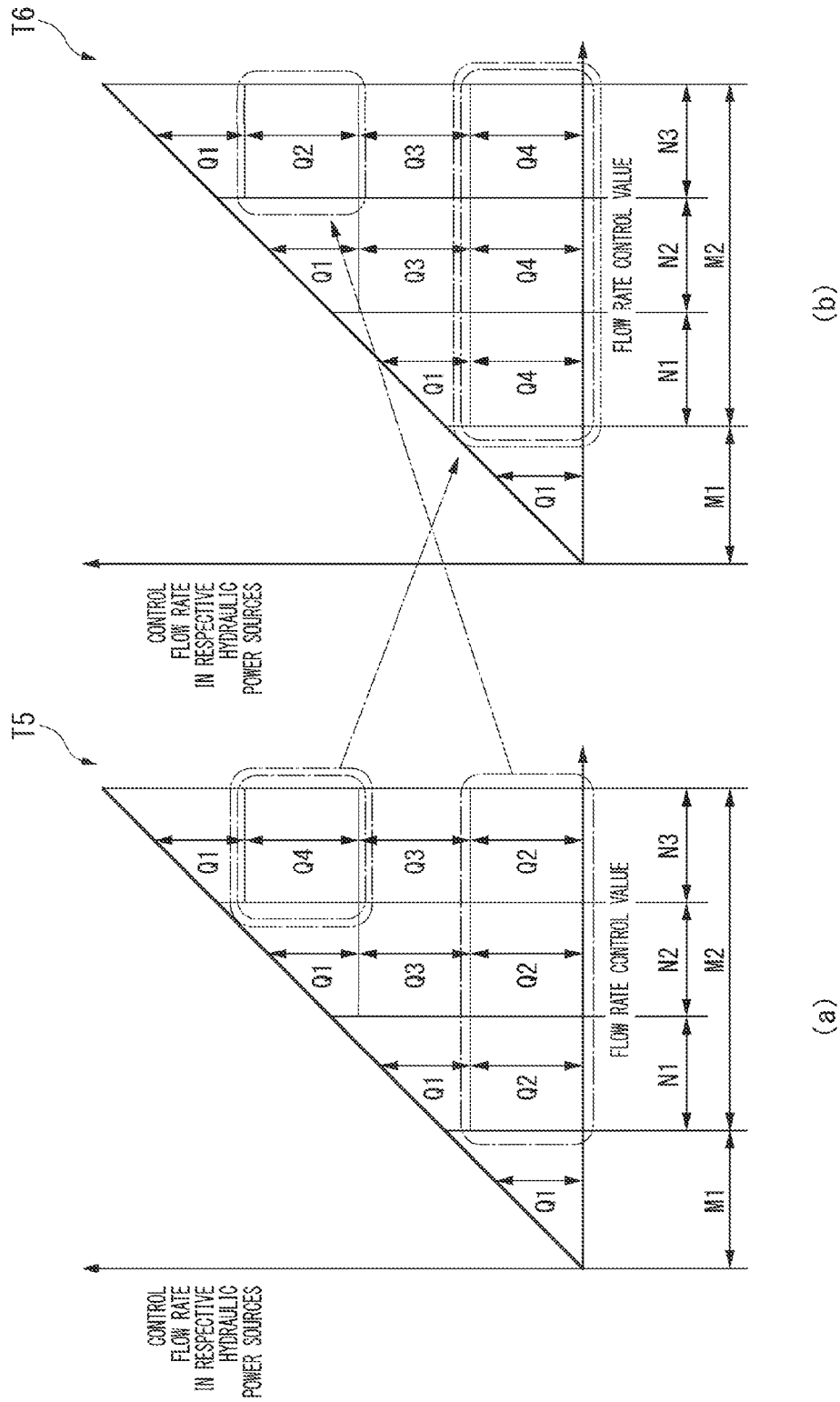
FIG. 13 is an explanatory view illustrating a table to be referred to in a flow rate control in an injection molding machine according to a third modified example of the first embodiment of the present invention.

FIG. 13 shows Tables T5 and T6 of a third modified example. In the present modified example, a different table for every step is stored in the storage unit 56. For example, Table T5 for the mold opening step and the mold closing step shown in a part of (a) in FIG. 13, and Table T6 for the injection step shown in a part of (b) in FIG. 13 are given. In Table T5 for the mold opening step and the mold closing step shown in the part of (a) in FIG. 13, setting is made in the second flow rate range M2 such that the first auxiliary hydraulic power source 22-1 begins to operate (flow rate Q2) in the first stage N1, the second auxiliary hydraulic power source 22-2 begins to operate (flow rate Q3) in the second stage N2, and the third auxiliary hydraulic power source 22-3 begins to operate (flow rate Q4) in the third stage N3. In contrast, in Table T6 for the injection step shown in the part of (b) in FIG. 13, setting is made such that the third auxiliary hydraulic power source 22-3 begins to operate (flow rate Q4) in the first stage N1, the second auxiliary hydraulic power source 22-2 begins to operate (flow rate Q3) in the second stage N2, and the first auxiliary hydraulic power source 22-1 begins to operate in the third stage N3 (flow rate Q2). That is, the timings of the flow rates Q2, Q3, and Q4 at which the operation of the respective auxiliary hydraulic power sources 22 are started are different in both tables T5 and T6. In this way, the opportunity for unbalanced operation of the plurality of auxiliary hydraulic power sources 22 can be eliminated by making the auxiliary hydraulic power sources 22 selected in respective stages different for every step. In addition, the same effects can be obtained even if a different table is referred.

Second Embodiment

Figure 14:
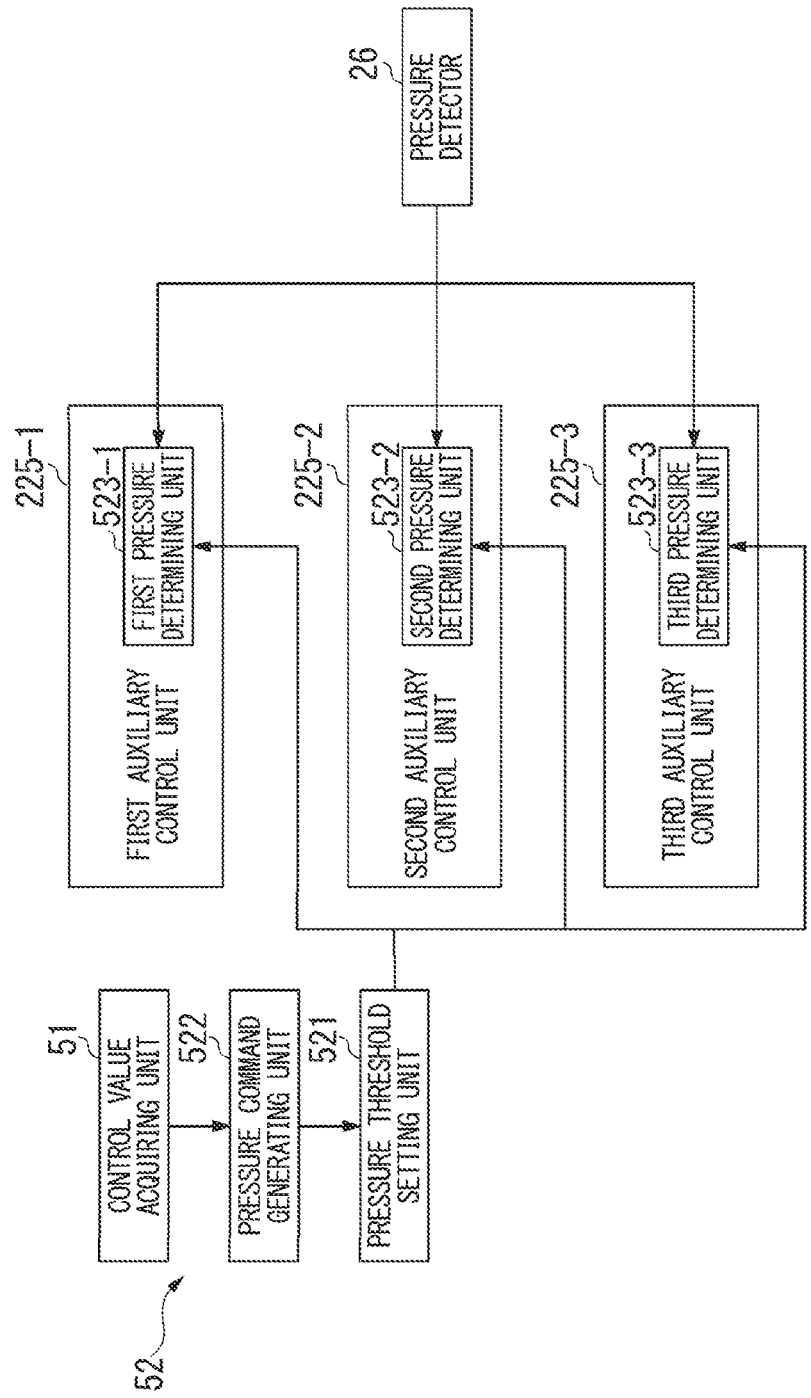
FIG. 14 is a block diagram of a pressure control unit of a molding machine control unit, in the injection molding machine according to a second embodiment of the present invention.
Figure 15:
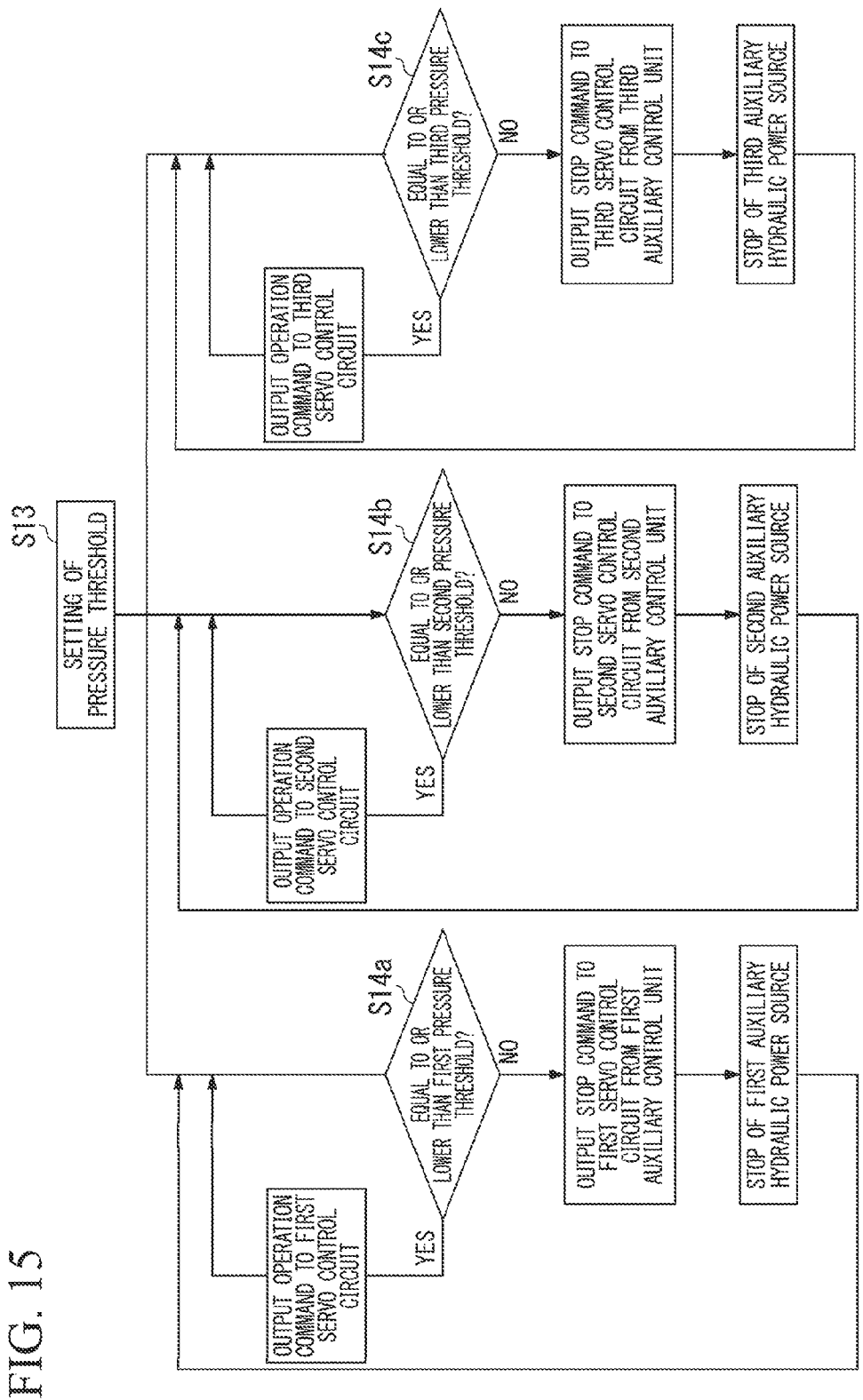
FIG. 15 is a flow diagram showing the details of a pressure control in the injection molding machine according to the second embodiment of the present invention.

A second embodiment will be described with reference to FIGS. 14 and 15. FIG. 14 is a pressure control block diagram of the second main hydraulic power source when auxiliary control units are provided with pressure determining units. FIG. 15 is a flow diagram showing the details of a pressure control of the present embodiment. Since the configuration of the present embodiment is different from the configuration of the first embodiment only in that the pressure determining units are provided in the auxiliary control units, pressure determination processing is simultaneously enabled in parallel, and the pressure threshold setting step S13 and the pressure determining step S14 during the pressure control are different, a description of the other configurations is omitted here.

As shown in FIG. 14, the pressure control unit 52 includes the pressure threshold setting unit 521 that sets pressure thresholds lower than a pressure control value in correspondence with the respective auxiliary hydraulic power sources 22 based on the pressure control value, and the pressure command generating unit 522 that generates and outputs a pressure command corresponding to the pressure control value. Additionally, the first auxiliary control unit 225-1, the second auxiliary control unit 225-2, and the third auxiliary control unit 225-3 are respectively equipped with a first pressure determining unit 523-1, a second pressure determining unit 523-2, and a third pressure determining unit 523-3 that are pressure determining units that determine whether or not the pressure of working oil detected by the pressure detector 26 is equal to or more than the pressure thresholds set by the pressure threshold setting unit 521. The pressure detected by the pressure detector 26 is input to the pressure determining units 523-1, 523-2, and 523-3, respectively.

Next, a control flow of pressure control by the pressure control unit 52 will be described.

As shown in FIG. 15, in a pressure threshold setting step S13, the pressure threshold setting unit 521 outputs respective set pressure thresholds to the respective pressure determining units 523-1, 523-2, and 523-3 of the corresponding auxiliary control units, and shifts to the pressure determining step S14. In addition, similar to the first embodiment, the pressure thresholds may be set in any manner as long as the pressure thresholds are set by values smaller than a reference value by preset pressure difference values.

In a pressure determining step S14, the respective pressure determining units 523 simultaneously perform the magnitude comparison between the pressure detected by the pressure detector 26 and the pressure thresholds as Steps S14*a*, S14*b*, and S14*c*. The pressure determining step S14 (S14*a*, S14*b*, and S14*c*) is repeated. Specifically, when the pressure is smaller than a first pressure threshold, the first pressure determining unit 523-1 does not output a determination result at all, and the first auxiliary control unit 225-1 operates the first auxiliary hydraulic power source 22-1 and continues the discharge of working oil so as to obtain the pressure control value, and repeats the pressure determining step S14*a*. Additionally, when the pressure is greater than the first pressure threshold, the first pressure determining unit 523-1 outputs the determination result of being higher than the pressure threshold to the first auxiliary control unit 225-1. Therefore, the first auxiliary control unit 225-1 outputs a stop command to the first servo control circuit 221-1, and stops the operation of the first auxiliary hydraulic power source 22-1, and terminates the discharge of working oil.

Additionally, when the pressure is smaller than the second pressure threshold, the second pressure determining unit 523-2 does not output at all, and the second auxiliary control unit 225-2 operates the second auxiliary hydraulic power source 22-2 and continues the discharge of working oil so as to obtain the pressure control value, and repeats the pressure determining step S14*b*. Additionally, when the pressure is greater than the second pressure threshold, the second pressure determining unit 523-2 outputs a determination result of being higher than the pressure threshold to the second auxiliary control unit 225-2. Therefore, the second auxiliary control unit 225-2 outputs a stop command to the second servo control circuit 221-2, and stops the operation of the second auxiliary hydraulic power source 22-2, and terminates the discharge of working oil.

Additionally, when the pressure is smaller than a third pressure threshold, the third pressure determining unit 523-3 does not output at all, and the third auxiliary control unit 225-3 operates the third auxiliary hydraulic power source 22-3 and continues the discharge of working oil so as to obtain the pressure control value, and repeats the pressure determining step S14*c*. Additionally, when the pressure is greater than the third pressure threshold, the third pressure determining unit 523-3 outputs a determination result of being higher than the pressure threshold to the third auxiliary control unit 225-3. Therefore, the third auxiliary control unit 225-3 outputs a stop command to the third servo control circuit 221-3, and stops the operation of the third auxiliary hydraulic power source 22-3, and terminates the discharge of working oil.

Moreover, as described above, the respective pressure determining units 523-1, 523-2, and 523-3 perform the pressure determination processing independently from one another and in parallel to one another, and repeat the pressure determining step S14 (S14*a*, S14*b*, and S14*c*). In addition, if the pressure of working oil drops abruptly and a required amount of working oil has increased abruptly for a certain reason, some or all of the auxiliary hydraulic power sources 22 operate again, based on the relationship between the detected pressure and the respective pressure thresholds corresponding to the above control flow, and the flow rates are recovered. This is the same as the first embodiment.

In the injection molding machine 1 of the present embodiment as above, the same effects as those of the first embodiment are obtained. In addition, the controls of the respective auxiliary hydraulic power sources 22-1, 22-2, and 22-3 can be performed independently from one another and in parallel to one another by the respective auxiliary control units 225-1, 225-2, and 225-3 provided in the respective auxiliary hydraulic power sources without performing the processing of the control unit 50 of the molding machine. Thus, the control response of the respective auxiliary hydraulic power sources is high, and the high speed high-precision operation of the hydraulic pumps is enabled.

Although the embodiments of the present invention have been described above in detail with reference to the drawings, the specific configuration is not limited to the embodiments, and design changes are also included without departing from the scope of the invention.

In addition, in the above present embodiment, the hydraulic actuators 10 include the mold opening and closing cylinder 11, the mold clamping cylinder 12, the injection cylinder 13, the metering motor 14, the injection apparatus moving cylinder 15, and the ejection cylinder 16. However, this is merely an example, and other hydraulic actuators may be included. Additionally, although there are three of the auxiliary hydraulic power sources 22, the invention is not limited, and at least one auxiliary hydraulic power source may be included. Additionally, although the molding machine control unit 50 also serves as the hydraulic control unit, and the hydraulic control unit includes the control value acquiring unit 51, the pressure control unit 52, the flow rate control unit 53, the command output unit 54, the switching control unit 55, and the storage unit 56, the hydraulic control unit may be separately provided. Additionally, although the hydraulic control unit includes the storage unit 56, acquires various setting values, and is enabled to refer to tables in the flow rate control, these may be acquired from the outside.

REFERENCE SIGNS LIST

1: Injection Molding Machine
10: Hydraulic Actuator
20: Hydraulic Supply Device
21: First Main Hydraulic Power Source
22: Auxiliary Hydraulic power Source
23: Second Main Hydraulic Power Source
25: Junction Pipe
27: First Switching Unit (Switching Unit)
50: Molding Machine Control Unit (Hydraulic Control Unit)

210: First Constant Rotational Speed Motor
211: First Main Hydraulic Pump
212: First Main Discharge Pipe
213: First Main Control Unit
220: Servo Motor
221: Servo Control Circuit
222: Auxiliary Hydraulic Pump
223: Auxiliary Discharge Pipe
224: Check Valve
225: Auxiliary Control Unit
230: Second Constant Rotational Speed Motor
231: Second Main Hydraulic Pump
232: Second Main Discharge Pump
233: Second Main Control Unit
521: Pressure Threshold Setting Unit
522: Pressure Command Generating Unit
523: Pressure Determining Unit
531: Flow Rate Command Generating Unit

The invention claimed is:

1. An injection molding machine comprising
a plurality of hydraulic actuators, and
a hydraulic supply device that supplies working oil to the hydraulic actuators to actuate the hydraulic actuators, wherein
an injection molding is performed by actuating the plurality of hydraulic actuators,
the hydraulic supply device comprises:
   a first main hydraulic power source having a first constant rotational speed motor that rotates at a constant rotational speed, a first main hydraulic pump that is driven by the rotational driving of the first constant rotational speed motor to discharge working oil, the first main hydraulic pump having variable capacity, and a first main discharge pipe through which the working oil discharged from the first main hydraulic pump flows;
   an auxiliary hydraulic power source having a servo motor in which rotational speed is controlled by a servo control circuit, an auxiliary hydraulic pump that is driven by the rotational driving of the servo motor to discharge working oil, the auxiliary hydraulic pump that operates with a preset specific capacity, an auxiliary discharge pipe through which the working oil discharged from the auxiliary hydraulic pump flows, and a check valve that is provided at the auxiliary discharge pipe to regulate the inflow of working oil to the auxiliary hydraulic pump;
   a hydraulic control unit that controls the first main hydraulic power source and the auxiliary hydraulic power source;
   a junction pipe at which the first main discharge pipe and the auxiliary discharge pipe join; and
   a switching unit that has the junction pipe connected thereto, and switches the supply and non-supply of working oil to at least some of the plurality of hydraulic actuators,
when a request for inputting a hydraulic pressure is received so as to obtain a predetermined pressure or flow rate in the junction pipe, the hydraulic control unit operates the first main hydraulic power source and selectively operates the auxiliary hydraulic power source based on a required pressure or flow rate;
the hydraulic control unit has a flow rate command generating unit that generates flow rate commands corresponding to the first main hydraulic power source and the auxiliary hydraulic power source, respectively, based on the flow rate control value of the hydraulic actuators targeted, and outputs the flow rate commands to the first main hydraulic power source and the corresponding auxiliary hydraulic power source;
the flow rate command generating unit has a first flow rate range and a second flow rate range, the first flow rate range is a range of a flow rate where only the first main hydraulic power source is actuated, and the second flow rate range is a range of a flow rate that is set to a greater flow rate than the first flow rate range and where the first main hydraulic power source and the auxiliary hydraulic power source are actuated;
when the flow rate control value is included in the first flow rate range, the flow rate command generating unit outputs a flow rate command corresponding to the flow rate control value to the first main hydraulic power source; and
when the flow rate control value is included in the second flow rate range, the flow rate command generating unit selects the auxiliary hydraulic power source to be driven based on the magnitude of the flow rate control value, outputs a flow rate command to the selected auxiliary hydraulic power source, and outputs a flow rate command corresponding to the shortfall in the flow rate of working oil which is generated in the selected auxiliary hydraulic power source with respect to the flow rate control value to the first main hydraulic power source.

2. The injection molding machine according to claim 1, wherein
the first flow rate range and the second flow rate range refer to a preset table, and
when the flow rate control value is included in the second flow rate range, the flow rate command which is output to the selected auxiliary hydraulic power source is a preset flow rate command corresponding to the auxiliary hydraulic power source to the selected.

3. The injection molding machine according to claim 1, further comprising
a pressure detector that is provided at the junction pipe to detect a pressure of working oil within the junction pipe, wherein
the hydraulic control unit includes:
   a pressure threshold setting unit that sets a pressure threshold lower than a pressure control value of the hydraulic actuators in correspondence with the auxiliary hydraulic power source, based on the pressure control value;
   a pressure command generating unit that generates a pressure command corresponding to the pressure control value and outputs to the first main hydraulic power source and the auxiliary hydraulic power source; and
   a pressure determining unit that determines whether or not the pressure of working oil detected by the pressure detector is equal to or more than the pressure threshold set by the pressure threshold setting unit, and
when the pressure determining unit determines that the pressure of working oil is greater than the pressure threshold, a stop command for stopping the auxiliary hydraulic power source corresponding to the pressure threshold is output.

4. The injection molding machine according to claim 3, wherein
a plurality of the auxiliary hydraulic power sources is provided, in the hydraulic control unit, the pressure threshold setting unit sets the pressure thresholds with a different magnitude for each auxiliary hydraulic power source, the pressure determining unit performs determination at the pressure thresholds, and the hydraulic control unit stops the auxiliary hydraulic power sources in a stepwise manner until the pressure of working oil reaches the pressure control value.

5. The injection molding machine according to claim 1, wherein a plurality of the auxiliary hydraulic power sources is provided, the second flow rate range of the table is divided into a plurality of stages equal to or more than the number of the auxiliary hydraulic power sources, and the flow rate command generating unit of the hydraulic control unit increases the number of the auxiliary hydraulic power sources to be operated based on the stages of the second flow rate range.

6. The injection molding machine according to claim 5, wherein the flow rate command generating unit outputs flow rate commands to the auxiliary hydraulic power sources in each step based on step information that specifies the types of a plurality of steps in injection molding as the auxiliary hydraulic power sources selected in the respective stages of the second flow rate range are different each other.

7. The injection molding machine according to claim 1, wherein the flow rate commands for the auxiliary hydraulic power sources in the second flow rate range are set to flow rates having a predetermined efficiency or higher for every auxiliary hydraulic power source.

8. The injection molding machine according to claim 1, wherein:

the hydraulic actuators include a mold opening and closing cylinder that generates a driving force that opens and closes the mold an injection cylinder that generates a driving force for injecting a material into the mold to an injection apparatus, an injection apparatus moving cylinder that generates a driving force to move the injection apparatus, and an ejection cylinder that generates a driving force for performing ejection of a molded product within the mold;

the hydraulic supply device includes a second main hydraulic power source that has a second constant rotational speed motor that rotates at a constant rotational speed, a second main hydraulic pump that is driven by the rotational driving of the second constant rotational speed motor to discharge working oil, and a second main discharge pipe through which the working oil discharged from the second main hydraulic pump flows, the second main hydraulic power source is independent from the first main hydraulic power source and the auxiliary hydraulic power source;

the mold opening and closing cylinder and the injection cylinder are connected to the first main hydraulic power source and the auxiliary hydraulic power source via the switching unit and the junction pipe, and the injection apparatus moving cylinder and the ejection cylinder are connected to the second main hydraulic power source.

9. A method for controlling an injection molding machine that actuates a plurality of hydraulic actuators to perform injection molding, the injection molding machine including the hydraulic actuators, and a hydraulic supply device that supplies working oil to the hydraulic actuators to actuate the hydraulic actuators, wherein the hydraulic supply device includes: a first main hydraulic power source having a first constant rotational speed motor that rotates at a constant rotational speed, a first main hydraulic pump that is driven by the rotational driving of the first constant rotational speed motor to discharge working oil, the first main hydraulic pump having variable capacity, and a first main discharge pipe through which the working oil discharged from the first main hydraulic pump flows; at least one auxiliary hydraulic power source having a servo motor in which rotational speed is controlled by a servo control circuit, an auxiliary hydraulic pump that is driven by the rotational driving of the servo motor to discharge working oil, the auxiliary hydraulic pump that operates with a preset specific capacity, an auxiliary discharge pipe through which the working oil discharged from the auxiliary hydraulic pump flows, and a check valve that is provided at the auxiliary discharge pipe to regulate the inflow of working oil to the auxiliary hydraulic pump; a hydraulic control unit that controls the first main hydraulic power source and the auxiliary hydraulic power source; a junction pipe at which the first main discharge pipe and the auxiliary discharge pipe join; and a switching unit that has the junction pipe connected thereto, and switches the supply and non-supply of working oil to at least some of the plurality of hydraulic actuators, the method comprising:

a hydraulic power source operation step of operating the first main hydraulic power source, and selectively operating the auxiliary hydraulic power source based on a required pressure or flow rate, when a request for inputting a hydraulic pressure is received so as to obtain a predetermined pressure or flow rate in the junction pipe, and a flow rate command outputting step of generating flow rate commands corresponding to the first main hydraulic power source and the auxiliary hydraulic power source, based on the flow rate control value of the hydraulic actuators targeted, and outputting the flow rate commands to the corresponding first main hydraulic power source and auxiliary hydraulic power source, wherein in the flow rate command outputting step, a flow rate command generating unit has a first flow rate range in which only the first main hydraulic power source is actuated, and a second flow rate range in which the first main hydraulic power source and the auxiliary hydraulic power source are actuated, the second flow rate range being greater than the first flow rate range, when the flow rate control value is within the first flow rate range, a flow rate command corresponding to the flow rate control value is output to the first main hydraulic power source, and when the flow rate control value is within the second flow rate range, the auxiliary hydraulic power source to be driven is selected based on the magnitude of the flow rate control value, a flow rate command is output to the selected auxiliary hydraulic power source, and a flow rate command corresponding to the shortfall in the flow rate of working oil which is generated in the selected auxiliary hydraulic power source with respect to the flow rate control value is output to the first main hydraulic power source.

10. The method for controlling an injection molding machine according to claim 9, further comprising:

a pressure threshold setting step of setting a pressure threshold lower than a pressure control value of the hydraulic actuators in correspondence with the auxiliary hydraulic power source, based on the pressure control value, a pressure command generating step of generating a pressure command corresponding to the pressure control value and outputting the pressure command to the first main hydraulic power source and the auxiliary hydraulic power source, and a pressure determining step of determining whether or not the pressure of working oil within a pipe at the junction pipe is equal to or more than the pressure threshold set by the pressure threshold setting unit, wherein when it is determined in the pressure determining step that the pressure of working oil is greater than the pressure threshold, a stop command for stopping the auxiliary hydraulic power source corresponding to the pressure threshold is output.

11. The method for controlling an injection molding machine according to claim 9, wherein the first flow rate range and the second flow rate range is stored as a preset table, and when the flow rate control value is within the second flow rate range, the flow rate command which is output to the selected auxiliary hydraulic power source is a preset flow rate command corresponding to the auxiliary hydraulic power source to the selected.

* * * * *